US012750674B2

(12) United States Patent
Freeman et al.

(10) Patent No.: US 12,750,674 B2
(45) Date of Patent: Sep. 29, 2026

(54) SECURE COMMUNICATION FOR COMMISSIONING AND DECOMMISSIONING CIRCUIT BREAKERS AND PANEL SYSTEM

(71) Applicant: LEVITON MANUFACTURING CO., INC., Melville, NY (US)

(72) Inventors: Scott Freeman, Melville, NY (US); Abhishek Golwala, Melville, NY (US); Rejaul Monir, Melville, NY (US); Ozgur Keser, Melville, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 74 days.

(21) Appl. No.: 19/004,599

(22) Filed: Dec. 30, 2024

(65) Prior Publication Data

US 2025/0247706 A1 Jul. 31, 2025

Related U.S. Application Data

(63) Continuation of application No. 16/487,482, filed as application No. PCT/US2018/019852 on Feb. 27, 2018, now Pat. No. 12,212,968.

(Continued)

(51) Int. Cl.

*H04L 29/06* (2006.01)
*G01R 31/327* (2006.01)

(Continued)

(52) U.S. Cl.

CPC ........ *H04W 12/50* (2021.01); *G01R 31/3277* (2013.01); *G01R 31/74* (2020.01); *G05B 13/028* (2013.01); *G05B 19/0426* (2013.01); *G06F 8/65* (2013.01); *G08B 5/36* (2013.01); *G08C 17/02* (2013.01); *H01H 71/04* (2013.01);

(Continued)

(58) Field of Classification Search

CPC .......... H04W 12/50; H04W 76/14; G06F 8/65
See application file for complete search history.

(56) References Cited

U.S. PATENT DOCUMENTS 5,223,795 A 6/1993 Blades
5,436,604 A 7/1995 Mrenna (Continued)

FOREIGN PATENT DOCUMENTS

EP 3002648 A2 4/2016
WO 2011091429 A2 7/2011
WO 2014018434 A2 1/2014

OTHER PUBLICATIONS

International Search Report and Written Opinion for Application No. PCT/US2018/019857, mailed on Jun. 27, 2018, pp. 14.

(Continued)

*Primary Examiner* — Wasika Nipa
(74) *Attorney, Agent, or Firm* — KDW Firm PLLC

(57) ABSTRACT

Communication enabled circuit breakers are described. Methods associated with secure communication between communication enabled circuit breakers and a panel system are described. Additionally, methods for commissioning and decommissioning such communication enabled circuit breakers in the panel system are described. The communication enabled circuit breakers may be paired with a controller and information regarding such breakers can be added to a database.

21 Claims, 11 Drawing Sheets

Related U.S. Application Data

(60) Provisional application No. 62/612,657, filed on Jan. 1, 2018, provisional application No. 62/612,654, filed on Jan. 1, 2018, provisional application No. 62/612,656, filed on Jan. 1, 2018, provisional application No. 62/500,051, filed on May 2, 2017, provisional application No. 62/465,046, filed on Feb. 28, 2017.

(51) Int. Cl.

| | |
|---|---|
| ***G01R 31/74*** | (2020.01) |
| ***G05B 13/02*** | (2006.01) |
| ***G05B 19/042*** | (2006.01) |
| ***G06F 8/65*** | (2018.01) |
| ***G08B 5/36*** | (2006.01) |
| ***G08C 17/02*** | (2006.01) |
| ***H01H 71/04*** | (2006.01) |
| ***H02H 1/00*** | (2006.01) |
| ***H02H 3/10*** | (2006.01) |
| ***H02H 7/26*** | (2006.01) |
| ***H04L 9/08*** | (2006.01) |
| ***H04L 12/28*** | (2006.01) |
| ***H04L 67/00*** | (2022.01) |
| ***H04Q 9/00*** | (2006.01) |
| ***H04W 4/80*** | (2018.01) |
| ***H04W 12/03*** | (2021.01) |
| ***H04W 12/0471*** | (2021.01) |
| ***H04W 12/50*** | (2021.01) |
| ***H04W 76/11*** | (2018.01) |
| ***H04W 76/14*** | (2018.01) |
| *G06F 7/58* | (2006.01) |

(52) U.S. Cl.

CPC ........ *H02H 1/0007* (2013.01); *H02H 1/0061* (2013.01); *H02H 1/0092* (2013.01); *H02H 3/10* (2013.01); *H02H 7/263* (2013.01); *H04L 9/0841* (2013.01); *H04L 12/2816* (2013.01); *H04L 67/34* (2013.01); *H04Q 9/00* (2013.01); *H04W 4/80* (2018.02); *H04W 12/03* (2021.01); *H04W 12/0471* (2021.01); *H04W 76/11* (2018.02); *H04W 76/14* (2018.02); *G05B 2219/25112* (2013.01); *G06F 7/588* (2013.01); *G08C 2201/93* (2013.01); *H04L 2209/805* (2013.01); *H04Q 2209/43* (2013.01)

(56) References Cited

U.S. PATENT DOCUMENTS

| | | | | |
|---|---|---|---|---|
| 5,467,286 | A | 11/1995 | Pyle | |
| 5,486,755 | A | 1/1996 | Horan | |
| 5,629,869 | A | 5/1997 | Johnson | |
| 5,805,813 | A | 9/1998 | Schweitzer, III | |
| 6,034,586 | A | 3/2000 | Runyan | |
| 6,055,144 | A | 4/2000 | Reid | |
| 6,195,243 | B1 | 2/2001 | Spencer | |
| 6,246,928 | B1 | 6/2001 | Louis | |
| 6,292,717 | B1 | 9/2001 | Alexander | |
| 6,295,190 | B1 | 9/2001 | Rinaldi | |
| 6,473,794 | B1 | 10/2002 | Guheen | |
| 6,628,496 | B2 | 9/2003 | Montjean | |
| 7,493,221 | B2 | 2/2009 | Caggiano | |
| 7,546,214 | B2 | 6/2009 | Rivers, Jr. | |
| 7,558,038 | B2 | 7/2009 | Wiese | |
| 7,719,257 | B2 | 5/2010 | Robarge | |
| 8,463,453 | B2 | 6/2013 | Parsons, Jr. | |
| 8,681,463 | B2 | 3/2014 | Franks | |
| 8,719,123 | B2 | 5/2014 | Rohrbaugh | |
| 9,432,214 | B2 | 8/2016 | Lal | |
| 9,438,026 | B2 | 9/2016 | Franks | |
| 9,715,796 | B2 | 7/2017 | Reid | |
| 9,853,458 | B1 | 12/2017 | Bell | |
| 10,063,592 | B1 * | 8/2018 | McClintock | H04L 63/20 |
| 2002/0075616 | A1 | 6/2002 | Montjean | |
| 2003/0086228 | A1 | 5/2003 | Papallo | |
| 2003/0167373 | A1 | 9/2003 | Winters | |
| 2005/0116814 | A1 | 6/2005 | Rodgers | |
| 2005/0168891 | A1 | 8/2005 | Nilman-Johansson | |
| 2005/0225909 | A1 | 10/2005 | Yoshizaki | |
| 2006/0050870 | A1 | 3/2006 | Kimmel | |
| 2006/0087783 | A1 | 4/2006 | Holley | |
| 2006/0238932 | A1 | 10/2006 | Westbrock | |
| 2007/0143043 | A1 | 6/2007 | Wafer | |
| 2007/0188954 | A1 | 8/2007 | Wiese | |
| 2007/0194942 | A1 | 8/2007 | Darr | |
| 2008/0079437 | A1 | 4/2008 | Robarge | |
| 2008/0142486 | A1 | 6/2008 | Vicente | |
| 2008/0209429 | A1 | 8/2008 | Van Riel | |
| 2008/0231485 | A1 | 9/2008 | Newlin | |
| 2008/0255782 | A1 | 10/2008 | Bilac | |
| 2009/0206059 | A1 | 8/2009 | Kiko | |
| 2010/0057387 | A1 | 3/2010 | Kagan | |
| 2011/0150482 | A1 | 6/2011 | Furusawa | |
| 2011/0279933 | A1 | 11/2011 | Campolo | |
| 2012/0098347 | A1 | 4/2012 | Beierschmitt | |
| 2012/0123762 | A1 | 5/2012 | Studer | |
| 2012/0140431 | A1 | 6/2012 | Faxvog | |
| 2012/0262093 | A1 | 10/2012 | Recker | |
| 2013/0029596 | A1 | 1/2013 | Preston | |
| 2013/0329331 | A1 | 12/2013 | Erger | |
| 2014/0134951 | A1 | 5/2014 | Paulson | |
| 2014/0146431 | A1 | 5/2014 | Franks | |
| 2014/0193294 | A1 | 7/2014 | Kain | |
| 2014/0197856 | A1 | 7/2014 | Ostrovsky | |
| 2014/0211345 | A1 | 7/2014 | Thompson | |
| 2014/0300486 | A1 | 10/2014 | Hummel | |
| 2014/0340222 | A1 | 11/2014 | Thornton | |
| 2015/0162157 | A1 | 6/2015 | Luebke | |
| 2015/0168487 | A1 | 6/2015 | Parker | |
| 2015/0188975 | A1 | 7/2015 | Hansen | |
| 2015/0207301 | A1 * | 7/2015 | Franks | H02H 3/162 361/634 |
| 2015/0296599 | A1 | 10/2015 | Recker | |
| 2015/0338472 | A1 | 11/2015 | Nuqui | |
| 2016/0099749 | A1 | 4/2016 | Bennett | |
| 2016/0100310 | A1 | 4/2016 | Lee | |
| 2016/0163186 | A1 * | 6/2016 | Davidson | G06Q 50/06 340/506 |
| 2016/0181036 | A1 | 6/2016 | Langdon, II | |
| 2016/0225562 | A1 * | 8/2016 | Franks | H02H 3/006 |
| 2016/0231375 | A1 | 8/2016 | Roemer | |
| 2016/0282828 | A1 | 9/2016 | Jauquet | |
| 2017/0005462 | A1 | 1/2017 | Williams | |
| 2017/0064798 | A1 | 3/2017 | Economy | |
| 2017/0103626 | A1 * | 4/2017 | Reid | G08B 5/36 |
| 2017/0163023 | A1 | 6/2017 | Niehoff | |
| 2018/0129801 | A1 | 5/2018 | Cambou | |
| 2018/0278724 | A1 | 9/2018 | Erdelyi | |
| 2020/0264234 | A1 | 8/2020 | Miller | |

OTHER PUBLICATIONS

International Search Report and Written Opinion for Application No. PCT/US2018/019856, mailed on May 11, 2018, pp. 14.

International Search Report and Written Opinion for Application No. PCT/US2018/019852, mailed on May 15, 2018, pp. 13.

International Search Report and Written Opinion for Application No. PCT/US2018/019859, mailed on May 16, 2018, pp. 11.

Allen, et al., "Supplementary Protectors/Miniature circuit breakers", Rockwell Software Rockwell Automation, Catalog Nos. 1492-SP Series C, Apr. 2011, pp. 46.

Elmark, "Technical Specification—Minature circuit breakers (MCB) C60DC Series", The brand of Electricity, pp. 3 and 4.

Techterms, "Overwrite", Techterms.com/definition/overwrite, Feb. 29, 2012, p. 1.

* cited by examiner

SECURE COMMUNICATION FOR COMMISSIONING AND DECOMMISSIONING CIRCUIT BREAKERS AND PANEL SYSTEM

CROSS-REFERENCE TO RELATED APPLICATIONS

This application is a continuation of U.S. patent application Ser. No. 16/487,482, filed on Aug. 21, 2019, which application is a United States National Phase filing of International Application No. PCT/US2018/019852, filed Feb. 27, 2018, which claims the benefit of U.S. Provisional Application Ser. No. 62/465,046, filed Feb. 28, 2017, entitled "Wireless Communication Enabled Circuit Breakers and Circuit Breaker Panels;" U.S. Provisional Application Ser. No. 62/500,051, filed May 2, 2017, entitled "Wireless Communication Enabled Circuit Breakers and Circuit Breaker Panels;" U.S. Provisional Application Ser. No. 62/612,654, filed Jan. 1, 2018, entitled "Secure Communication for Commissioning and Decommissioning Circuit Breakers and Panel System;" U.S. Provisional Application Ser. No. 62/612,656, filed Jan. 1, 2018, entitled "Communication Enabled Circuit Breakers;" and U.S. Provisional Application Ser. No. 62/612,657, filed Jan. 1, 2018, entitled "Communication Enabled Circuit Breakers;" which applications are incorporated herein by reference in their entirety.

FIELD OF THE DISCLOSURE

The present invention relates generally to circuit breakers. More particularly, the present invention relates to communication enabled circuit breakers and circuit breaker panels that house circuit breakers.

BACKGROUND OF THE DISCLOSURE

Circuit breakers provide protection in electrical systems by disconnecting a load from a power supply based on certain fault conditions, e.g., ground fault, arc fault, overcurrent. In general, circuit breakers monitor characteristics of the electrical power supplied to branch circuits. The circuit breakers function to automatically interrupt, open, 'trip' or 'break' the connection between the power supply and a branch circuit when fault conditions (e.g., arc faults, ground faults, and unsafe overcurrent levels) are detected on the supplied branch, e.g., automatically open a switch to disconnect the branch from the power supply when such fault conditions are detected.

Existing circuit breaker panels and circuit breakers housed by such panels may provide limited information to electricians and consumers about the nature of the fault conditions observed by circuit breakers. For example, electricians and consumers may be able to determine that a circuit breaker has tripped by visual inspection of the circuit breaker or if power is lost on one or more loads. The visual inspection of the circuit breaker generally requires observing an operating switch associated with the circuit breaker. The operating switch of the circuit breaker is provided to allow for manually opening and closing contacts of the circuit breaker. The operating switch is also typically used to reset the circuit breaker after the circuit breaker has tripped due to a detected fault condition.

It is to be appreciated, that circuit breakers are typically installed in circuit breaker panels, which are themselves typically located in dedicated electrical rooms, basements, garages, outdoor spaces, etc. Additionally, circuit breaker panels often include a door or cover that limits access to the circuit breakers housed therein. Therefore, locating, inspecting and/or resetting deployed circuit breakers may be difficult. Furthermore, because circuit breakers generally require visual inspection to determine if a fault condition has occurred, property owners and/or residents may not immediately recognize when an electrical fault condition has caused a circuit breaker to trip. Failure to immediately recognize when an electrical fault condition has caused a circuit breaker to trip may cause damage to property and/or personal effects due to a loss of electricity to one or more loads.

DETAILED DESCRIPTION

Communication enabled circuit breakers and circuit breaker panels are provided. Methods associated with such communication enabled circuit breakers and circuit breaker panels are also provided.

Embodiments provided herein, can be implemented to provision a circuit breaker panel with several communication enabled circuit breakers. Said differently, the present disclosure provides examples and embodiments to deploy, pair, and commission communication enabled circuit breakers in a circuit breaker panel. For example, the present disclosure might be implemented at initial installation of a circuit breaker panel including communication enabled circuit breakers. As a specific example, the communication enabled circuit breakers and a circuit breaker controller can implement one of the various examples described herein at the time of installation or deployment of the communication enabled circuit breaker(s) and/or circuit breaker controller, such as, by an electrician or installer.

It is noted, that the present disclosure often uses examples of communication enabled circuit breakers and panels, which may be wirelessly coupled. It is to be appreciated that the examples given herein can be implemented using wired communication technologies (e.g., Ethernet, RS232, USB, or the like) instead of wireless communication technologies. As such, the use of the term "wireless" when referring to the communication technologies that may be implemented by the breakers and/or panels is not intended to be limiting to breakers and panels which only communicate wirelessly. Furthermore, system components can be referred to as "wireless" without implying that the elements recited thereto are devoid of wires or physical conductors/conductive paths.

Figure 1:
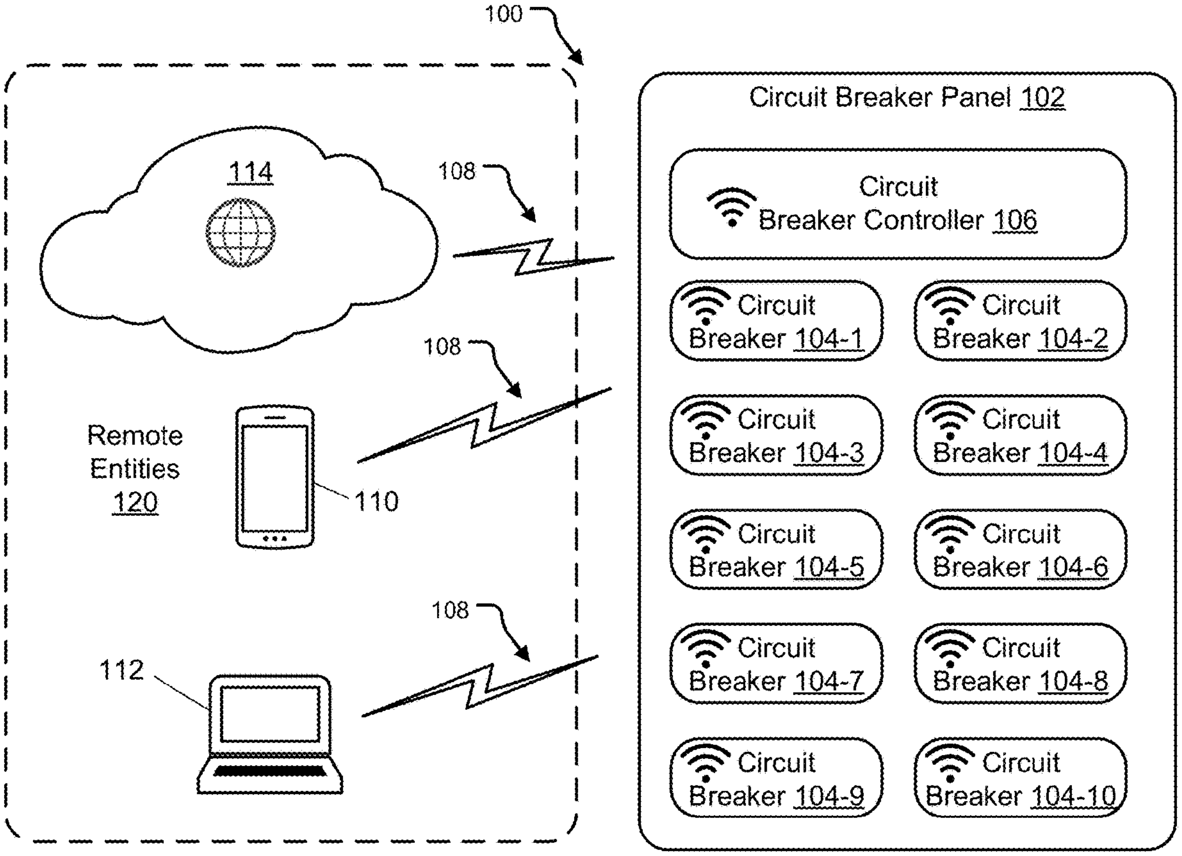
FIG. 1 illustrates a communication enabled circuit breaker and panel system in accordance with an exemplary embodiment.

FIG. 1 illustrates a communication enabled circuit breaker and panel system 100 in accordance with an exemplary embodiment. The communication enabled circuit breaker and panel system 100 includes a circuit breaker panel 102. The circuit breaker panel 102 may include any number of communication circuit breakers 104-*n*, where n is a positive integer. For example, system 100 is depicted including communication enabled circuit breakers 104-1, 104-2, 104-3, 104-4, 104-5, 104-6, 104-7, 104-8, 104-9 and 104-10. It is noted, system 100 is depicted with communication enabled circuit breaker 104-1 to 104-10 for purposes of clarity and not limitation. For example, system 100 can include panel 102 having any number (e.g., 1, 2, 3, 4, or more) of communication enabled circuit breakers 104-*n*. Additionally, panel 102 may include both communication enabled circuit breakers (e.g., 104-1 to 104-10) as well as conventional circuit breakers (not shown).

Additionally, although each of the communication enabled circuit breakers 104-1 to 104-10 are labeled as breaker 104, it is to be understood that communication enabled circuit breakers 104-1 to 104-10 are not necessarily identical. For example, communication enabled circuit breaker 104-1 may be a ground fault circuit interrupter (GFCI) device; communication enabled circuit breaker 104-2 may be an arc fault circuit interrupter (AFCI) device; communication enabled circuit breaker 104-3 may be a conventional overcurrent circuit breaker, an overcurrent hydraulic-magnetic circuit breaker, an overcurrent thermal magnetic circuit breaker, or the like; communication enabled circuit breaker 104-4 may include both GFCI and AFCI functionalities. Furthermore, each of the communication enabled circuit breakers 104-1 to 104-10 may be rated for a predefined trip amperage or overcurrent state, and not necessarily the same predefined trip amperage or overcurrent state.

Furthermore, communication enabled circuit breakers 104-1 to 104-10 may be shaped and sized differently. For example, communication enabled circuit breaker 104-1 may be a double pole circuit breaker having a 2 inch width; communication enabled circuit breaker 104-2 may be a single circuit breaker having a 1 inch width; communication enabled circuit breaker 104-2 may be a circuit breaker having a ¾ inch width; communication enabled circuit breaker 104-2 may be a circuit breaker having a 1 & ½ inch width; etc. The width of the communication enabled circuit breakers 104-1 to 104-10 refers to the shorter side of the generally rectangular visible face of the wireless circuit breakers 104-1 to 104-10 once it is installed in the circuit breaker panel 102.

Each of the communication enabled circuit breakers 104-1 to 104-10 may include communication components (refer to FIGS. 2-3), which in some examples can be wireless. Such communication components associated with each of the communication enabled circuit breakers 104-1 to 104-10 may enable the communication enabled circuit breakers 104-1 to 104-10 to communicate (e.g., send and/or receive information elements including data, indications of operating conditions, instructions, updated fault interruption instructions, or the like) using any of a variety of communication standards. For example, in the case of wireless communication, the communication enabled circuit breakers 104-1 to 104-10 can include wireless communication components arranged to communicate via a wireless communication protocol, e.g., Bluetooth® Low Energy (BLE), thus enabling the communication enabled circuit breakers 104-1 to 104-10 to communicate using BLE communication schemes. In the case of wired communication, the communication enabled circuit breakers 104-1 to 104-10 can include wired communication components arranged to communicate via a wired communication protocol, e.g., USB or MTP, thus enabling the wired circuit breakers to communicate using a wired communication scheme.

The circuit breaker panel 102 further houses a circuit breaker controller 106. The circuit breaker controller 106 may include communication components (refer to FIG. 4). In an alternative embodiment, the circuit breaker controller 106 is coupled to the circuit breaker panel 102 in an external arrangement. For example, the controller 106 could be housed in a different panel than panel 102 or disposed external to the panel 102. The communication components associated with the circuit breaker controller 106 may enable the controller 106 to communicate (e.g., send and/or receive information elements including data, indications of operating conditions, instructions, updated fault interruption instructions, or the like) using any of a variety of communication standards.

In general, the communication enabled circuit breakers 104-1 to 104-10 and the circuit breaker controller 106 (and particularly, the communication components of these devices) can be arranged to communicate using a variety of communication technologies, which may be wireless or wired in nature. For example, the circuit breaker controller 106 can be arranged to wirelessly communicate via ZigBee®, Z-Wave, Bluetooth®, Bluetooth® Low Energy (BLE), 6LowPan, Thread, Cellular, Sigfox®, NFC, Neul®, LoRaWAN™, or the like. In some implementations, the communication enabled circuit breakers 104 and circuit breaker controller 106 may communicate via wired (as opposed to wireless) technologies. For example, the communication enabled circuit breakers 104 may be communicatively coupled via a wired link to the circuit break controller 106.

The circuit breaker controller 106 may be configured to communicate via multiple communication components. For example, circuit breaker controller 106 may be configured to communicate with communication enabled circuit breakers 104-1 to 104-10 via BLE as described above. Additionally, the circuit breaker controller 106 can be configured to communicate (e.g., send and/or receive information elements including data, indications of operating conditions, instructions, updated fault interruption instructions, or the like) via a second wireless communication scheme or via a wired communication scheme. For example, the circuit breaker controller 106 could include wireless communication components arranged to wirelessly communicate via Wi-Fi® technology, thus enabling the circuit breaker controller 106 to communicate using Wi-Fi communication schemes. Accordingly, the circuit breaker controller 106 can communicate with devices external to the circuit breaker panel 102 via wireless channel 108, for example, using Wi-Fi communication schemes. In general, however, the circuit breaker controller 106 may be enabled to communicate with devices external to the circuit breaker panel 102 using any suitable type of communication technology, either wireless or wired (e.g., BLE, 4G, LTE, Wi-Fi, USB, RS232, MTP, etc.).

Component from the circuit breaker panel 102 may communicate (e.g., wirelessly or wired) with one or more remote entities 120. For example, the communication enabled circuit breakers 104 and/or the circuit breaker controller 106 of panel 102 may communicate wirelessly with a mobile device 110 (e.g., tablet computer, mobile phone, etc.), a computing device 112 (desktop computer, server, etc.) and/or the Internet 114 (e.g., a server device or computing device linked to the Internet). For example, the communication enabled circuit breakers 104-1 to 104-10 can communicate with the circuit breaker controller 106, which can itself, communicate with any one of remote entities 120. It is noted, remote entities 120 are depicted including mobile device 110, computing device 112, and Internet 114. However, remote entities 120 could include just a single device or entity remote to circuit breaker panel 120. The term remote entities 120 is used herein to refer to one or more devices remote to the panel 120, such as, for example, mobile device 110, computing device 112, and Internet 114. Furthermore, although the term remote entity 120 is sometimes used herein in the plural, it is not intended to imply or denote multiple devices or multiple entities remote to panel 102 but could simply refer to a single entity remote to the system (e.g., just the Internet 114, just the mobile device 110, or the like).

In some examples, the communication enabled circuit breakers 104-1 to 104-10 can directly couple to remote entities 120. For example, the mobile device 110 can communicate directly (e.g., via BLE) with at least one of the communication enabled circuit breakers 104-1 to 104-10. In addition, the circuit breaker panel 102 (e.g., via the circuit breaker controller 106) may include wireline connectivity functionality, such as an Ethernet port, to enable wireline communication with one or more remote entities. In some implementations, the communication enabled circuit breakers 104-1 to 104-10 may establish a mesh network. For example, communication enabled circuit breaker 104-1 may share a wireless connection with a remote entity 120 with communication enabled circuit breaker 104-2. Furthermore, in such a mesh network topology, communication enabled circuit breaker 104-2 may share the wireless connection to the remote entity 120 with communication enabled circuit breaker 104-3 and communication enabled circuit breaker 104-4. Therefore, using the mesh network topology, the wireless connection to the remote entity 120 may be shared between the communication enabled circuit breakers 104-1 to 104-10. The mesh network may be implemented in accordance with wireless communication schemes, or standards, such as, BLE standards, Wi-Fi standards, or the like.

The present disclosure provides several example embodiments that can be implemented to "pair" communication enabled circuit breakers 104-1 to 104-10 to circuit breaker controller 106, thereby commissioning panel system 100 or to decommission wireless communication circuit breaker(s) 104-1 to 104-10 from circuit breaker controller 106. Such example embodiments are depicted in FIGS. 6-10 and described below.

In general, circuit breaker controller 106 and a remote entity, such as, mobile device 110 can be arranged to pair, or otherwise commission communication enabled circuit breakers 104 to circuit breaker controller 106 of panel 102. Various examples of such pairing and commissioning, or decommissioning are given further below when describing FIGS. 6-10. As part of the commissioning process, information including indications of the arrangement, connection, type, characteristics, position, capacity, or the like of breakers 104 can be identified and stored in a database 118 (see FIGS. 4-5). As depicted and described below, database 118 can be stored in storage of controller 106 or a remote entity, such as, mobile device 110, the Internet, or the like. Access to database 118 can be facilitated and/or provided via a graphical user interface (GUI) or user interface (UI). Thus, a user can determine, via the GUI and/or UI information about breakers 104 within panel 102.

However, prior to describing these several example embodiments, a description of the system 100 and particularly components and operation of exemplary communication enabled circuit breakers 104 and an exemplary circuit breaker controller 106 of the system 100 is given. As described above, the present disclosure can be implemented to provide communication enabled circuit breakers 104, circuit breaker controller 106, and remote entities 120, arranged to communicate via either wired or wireless communication protocols and technologies. However, for clarity of presentation, the following examples depict and describe communication enabled circuit breakers 104 and a circuit breaker controller 106 arranged to communicate via wireless communication protocols. As such, many of the communication enabled circuit breakers 104 described in the following examples are referred to as "wireless circuit breakers" 104 or "communicating circuit breaker" 104. Likewise, the circuit breaker controller 106 may be referred to as a "wireless circuit breaker controller" 106. This is not intended to be limiting and the example breakers, controller, remote entities, techniques, and systems depicted and described below can be implemented with wired communication technologies without departing from scope of the disclosure. Additionally, the wireless circuit breakers 104 and the wireless circuit breaker controller 106 are described herein to communicate via BLE for purposes of convenience and clarity of presentation. This is also not intended to be limiting.

FIGS. 2-5 illustrate example embodiments of wireless circuit breakers, a wireless circuit breaker controller, and a mobile device. FIGS. 6-9 illustrate example techniques that can be implemented by these exemplary devices to pair wireless communication enabled circuit breakers with a wireless circuit breaker controller to commission a panel system. The example breakers, controller, and mobile device, along with components included in these example embodiments, are first described followed by the description of example commissioning techniques.

Figure 2:
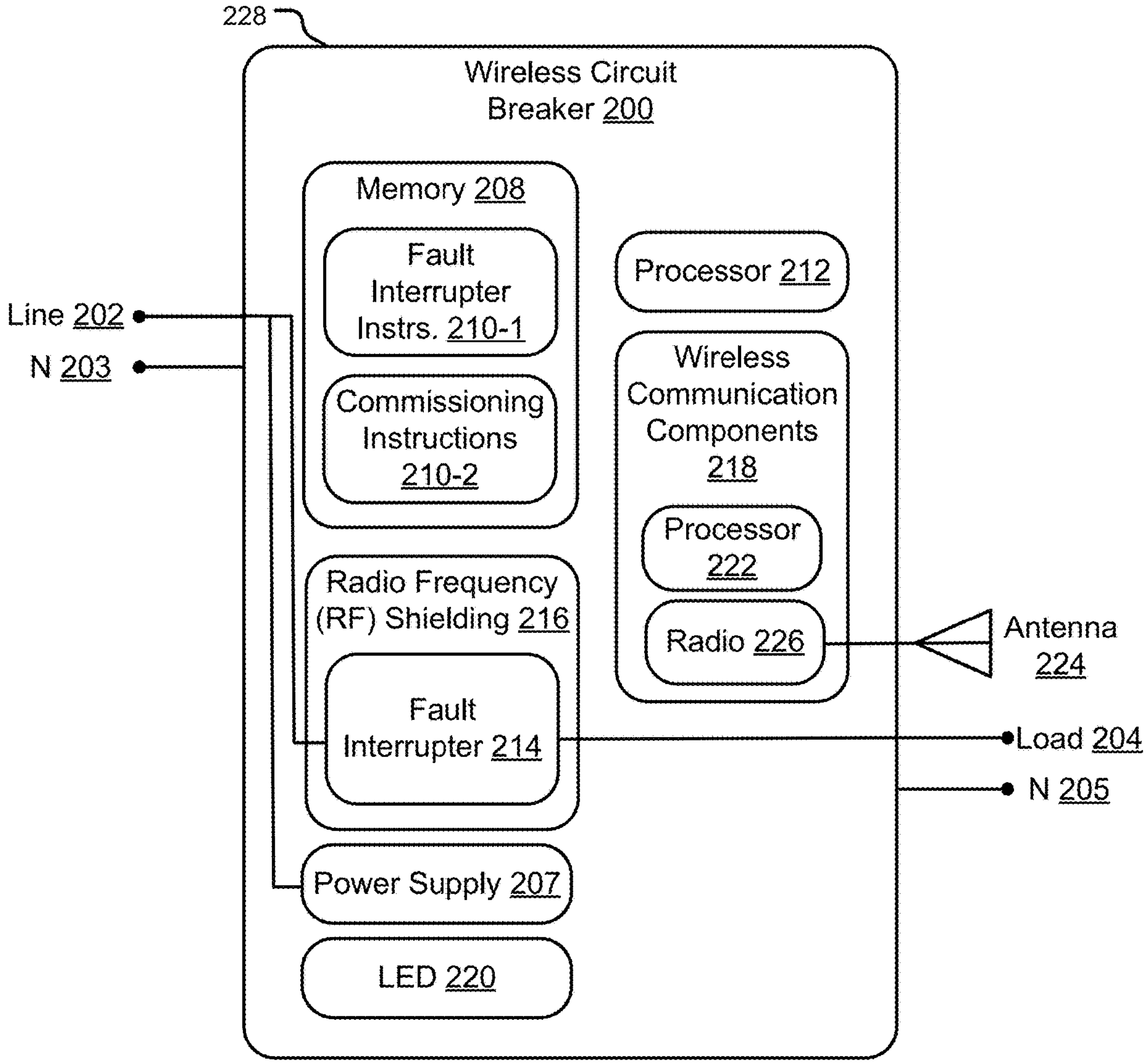
FIG. 2 illustrates a first exemplary embodiment of a communication enabled circuit breaker.

FIG. 2 illustrates a wireless circuit breaker 200 in accordance with an exemplary embodiment. In some examples, the wireless circuit breaker 200 can be implemented as any one of the communication enabled circuit breakers 104-1 to 104-1 of the system 100 of FIG. 1. Generally, the wireless circuit breaker 200 may be used in a wide range of commercial, residential, and industrial circuit breaker panels. The wireless circuit breaker 200 may be configured to operate in conjunction with different electrical power distribution systems, including single-phase, split-phase, 3-phase delta, and 3-phase star. These systems may operate at any suitable voltage such as 120/240 (120V phase-neutral, 240 phase-to-phase), 120/208, 265/460, 277/480.

The wireless circuit breaker 200 includes multiple connections or "terminals." Specifically, wireless circuit breaker 200 includes a line side phase connection 202, a line side neutral connection 203, a load side phase connection 204, and a load side neutral connection 205. The line side phase connection 202 and line side neutral connection 203 are coupled to a power source. The load side power phase connection 204 and load side neutral connection 205 are coupled to a load. Thus, current can enter the wireless circuit breaker 200 via the line side phase connection 202, exit the wireless circuit breaker 200 via the load side phase connection 204, return to the wireless circuit breaker 200 via load side neutral connection 205, and travel back to the power source via line side neutral connection 203. The line side phase connection 202 and neutral connection 203 may be coupled to a power source (e.g. an electrical grid). The load side phase connection 204 and the load side neutral connection 205 may be coupled to a load (e.g., HVAC system, refrigerator, TV, etc.).

The wireless circuit breaker 200 may include a power supply 207. The power supply 207 receives an input power from the line side phase connection 202 and the line side neutral connection 203. The power supply 207 converts, in some implementations, an AC voltage to a regulated DC voltage for use by some or all the electrical components associated with the wireless circuit breaker 200. To that end, the voltage provided by the power supply 207 is uninterrupted even when the wireless circuit breaker 200 is caused to trip because of a trip incident. In some examples, the power supply 207 includes circuitry to condition the current and/or voltage supplied to the electrical components of the wireless circuit breaker 200. In some examples, power supply 207 includes a fuse, which can in some embodiments be replaceable, to protect the power supply 207 and wireless circuit breaker 200 from overcurrent conditions. In some examples, the power supply 207 itself includes a circuit breaker to protect the power supply 207 and wireless circuit breaker 200 from overcurrent conditions. In some examples, power supply 207 itself includes a circuit breaker to protect the power supply 207 and wireless circuit breaker 200 from overcurrent conditions.

A memory 208 is disposed in the wireless circuit breaker 200. The memory 208 may comprise an article of manufacture. In some examples, the memory 208 may include any non-transitory computer readable medium or machine readable medium, such as an optical, magnetic or semiconductor storage. The memory 208 may store various types of computer executable instructions 210. The memory 208 may be coupled to a processor 212. The processor 212 could be any of a variety of processors, such as, for example, a central processing unit, a microprocessor, a field programmable gate array, an application specific integrated circuit, or the like. The processor 212 can be arranged to execute instructions 210 to aid in performing one or more techniques described herein.

In some implementations, the memory 208 is configured store fault interrupter instructions 210-1. The processor 212 can be arranged to execute fault interrupter instructions 210-1 during operation of breaker 200, to for example, cause the wireless circuit breaker 200 to trip, cause the wireless circuit breaker 200 to set, wirelessly transmit data related to a remote entity 120 (e.g., via controller 106, or the like). Additionally, the memory 208 is configured store commissioning instructions 210-2. The processor 212 can be arranged execute commissioning instructions 210-2 to aid in initially pairing and/or commissioning breaker 104 to a panel (e.g., panel 102, or the like) as detailed herein. In general, processor 212 can be arranged to execute commissioning instructions 210-2 to aid in initially commissioning breaker 200 per one or more techniques described herein. For example, the processor 212 can cause the wireless circuit breaker 200 to broadcast a pairing beacon via radio 226 and antenna 224 upon an initial powering up of breaker 200. In some examples, processor 212, in executing commissioning instructions 210-2 can cause radio 226, via antenna 224, to transmit an information element including indications of a pairing code, a breaker type, a serial number, a breaker capacity, or the like to a remote entity, such as, for example, mobile device 110. Such examples are described in greater detail below.

In some examples, the wireless circuit breaker 200 could be provisioned with more than one set of fault interrupter instructions 210-1. For example, memory 208 could store different sets (or types) of fault interrupter instructions 210-1 while processor 212 could be arranged to execute a selected one of the sets of fault interrupter instructions 210-1 depending upon certain condition(s), e.g., whether the building in which the panel is coupled is occupied, whether the building in which the panel is coupled is under constructions, a time of day, a time of year, a geographic location of the panel, or the like.

Examples of a memory 208, which may be a non-transitory computer readable or machine-readable storage medium, may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context. The memory 208 may be one or more memory chips capable of storing data and allowing any storage location to be directly accessed by the processor 212, such as any type or variant of Static random-access memory (SRAM), Dynamic random access memory (DRAM), electrically erasable programmable read-only memory (EEPROM), Ferroelectric RAM (FRAM), NAND Flash, NOR Flash and Solid State Drives (SSD).

The wireless circuit breaker 200 includes a fault interrupter 214 or a "circuit interrupter" 214. In some implementations, the fault interrupter 214 is operable to interrupt faults (e.g., decouple the load side phase connection 204 from the line side phase connection 202) based in part on the fault interrupter instructions 210-1 stored in the memory 208. As used herein, the term "fault" could include any of a variety of conditions with which it may be desirable for the wireless circuit breaker 200 to disconnect the line side connection from the load side connection. For example, "fault" may be a fault within the breaker, a fault on the load side, a fault on the line side, or the like. As another example, "fault" may be a ground fault, an arc fault, an overcurrent fault, or the like. Examples are not limited in these contexts. The fault interrupter 214 may comprise various hardware elements. In some examples, the fault interrupter 214 includes at least a trip solenoid and/or an energy storage element to trip the trip solenoid and cause the line side connection 202 to decouple from load side connection 204. In further examples, the fault interrupter 214 can include a set solenoid and/or energy storage element to set the breaker 200 and cause the line side connection 202 to couple to the load side connection 204. The fault interrupter instructions 210-1 may be executed (e.g., by fault interrupter 214, by processor 212, or the like) to cause the trip solenoid to break current flowing from the line side phase connection 202 to the load side phase connection 204 in specific conditions or to cause the trip solenoid to restore current flowing from the line side phase connection 202 to the load side phase connection 204 in specific conditions. For example, when the current exceeds a threshold defined by the fault interrupter instructions 210. In another example, the fault interrupter 214 includes functionality, controllable by way of the fault interrupter instructions 210, to sense characteristics of a line current, for example an amount of current, a frequency of the current, high-frequency current components, dynamic distribution of the frequency components over time and within a half cycle of a power line frequency, various profiles of power line characteristics, etc. As another example, the fault interrupter 214 includes functionality, controllable by way of the fault interrupter instructions 210, to set the breaker 200, such as, upon receipt of a control signal from a remote entity 120 where the control signal includes an indication to set the breaker.

The fault interrupter 214 may be sensitive to radio frequency (RF) signals (i.e., wireless signals). Therefore, the fault interrupter 214 may be partially or completely surrounded by an RF shielding 216. The RF shielding 216 may comprise any suitable material such as ferrous material, to attenuate wireless signals. In some implementations, the RF shielding 216 shields the fault interrupter 214 from wireless signals generated by the wireless circuit breaker 200, other wireless circuit breakers 200, wireless circuit breaker controller 106, and/or entities external of the circuit breaker panel 102.

The wireless circuit breaker 200 includes wireless communication components 218. The wireless communication components 218 enable the wireless circuit breaker 200 to communicate wirelessly using any suitable type of wireless communication technology, such as that described herein. The wireless communication components 218 may include at least a radio 226, an antenna 224, and processor 222. In general, the radio 226 can be any radio configured to communicate using a wireless transmission scheme, such as, for example, BLE. The antenna 224 can be coupled to the radio 226 and configured to emit and receive RF signals. For example, the antenna 224 can emit RF signals received from the radio 226 (or radio transceiver circuitry, which is not depicted for clarity) coupled between the radio 226 and the antenna 224. The antenna 224 could be any of a variety of antennas (or antenna arrays) having different shapes and/or configurations arranged to emit/receive RF signals on a frequency, range of frequencies, or the like. Furthermore, the antenna 224 could be internal to the housing 228 of the wireless circuit breaker 200 or external to the housing 228 or packing of the breaker 200. The processor 222 can be any of a variety of processors (e.g., application processor, baseband processors, etc.) arranged to perform at least transmission and reception of wireless signals associated with the wireless circuit breaker 200.

As described, the wireless communication components 218 receives power from the power supply 207, which is coupled to the line side phase connection. Therefore, the wireless communication components 218 enable the wireless circuit breaker 200 to communicate wirelessly even if the fault interrupter 214 interrupts current flowing between the line side phase connection 202 and the load side phase connection 204. In some examples, the transmission power for radio 226 can be throttled and/or power limited. For example, radio 226 transmission power can be throttled to reduce incidences of interference with adjacent devices (e.g., other breakers in a panel, devices adjacent to panel, or the like).

An indicator may be implemented on the wireless circuit breaker 200. The indicator may be any suitable type of indicator such as a visual or audible indicator including but not limited to, an LED, neon bulb, and/or piezoelectric buzzer. In the present embodiment, the indicator is a light emitting diode (LED) 220. The LED 220 may be illuminated to a predefined color as part of the commissioning process. This is described in greater detail below.

The wireless circuit breaker 200 may comprise the housing 228. The housing 228 may be a miniature circuit breaker (MCB) housing. In some implementations, the MCB housing has a width of 1 inch. It is noted, that the dimensions of the breakers are given for example only. Breaker widths could be any width, e.g., ½ inch, ¾ inch, 1 inch, 1 ½ inches, 2 inches, or the like.

Figure 3:
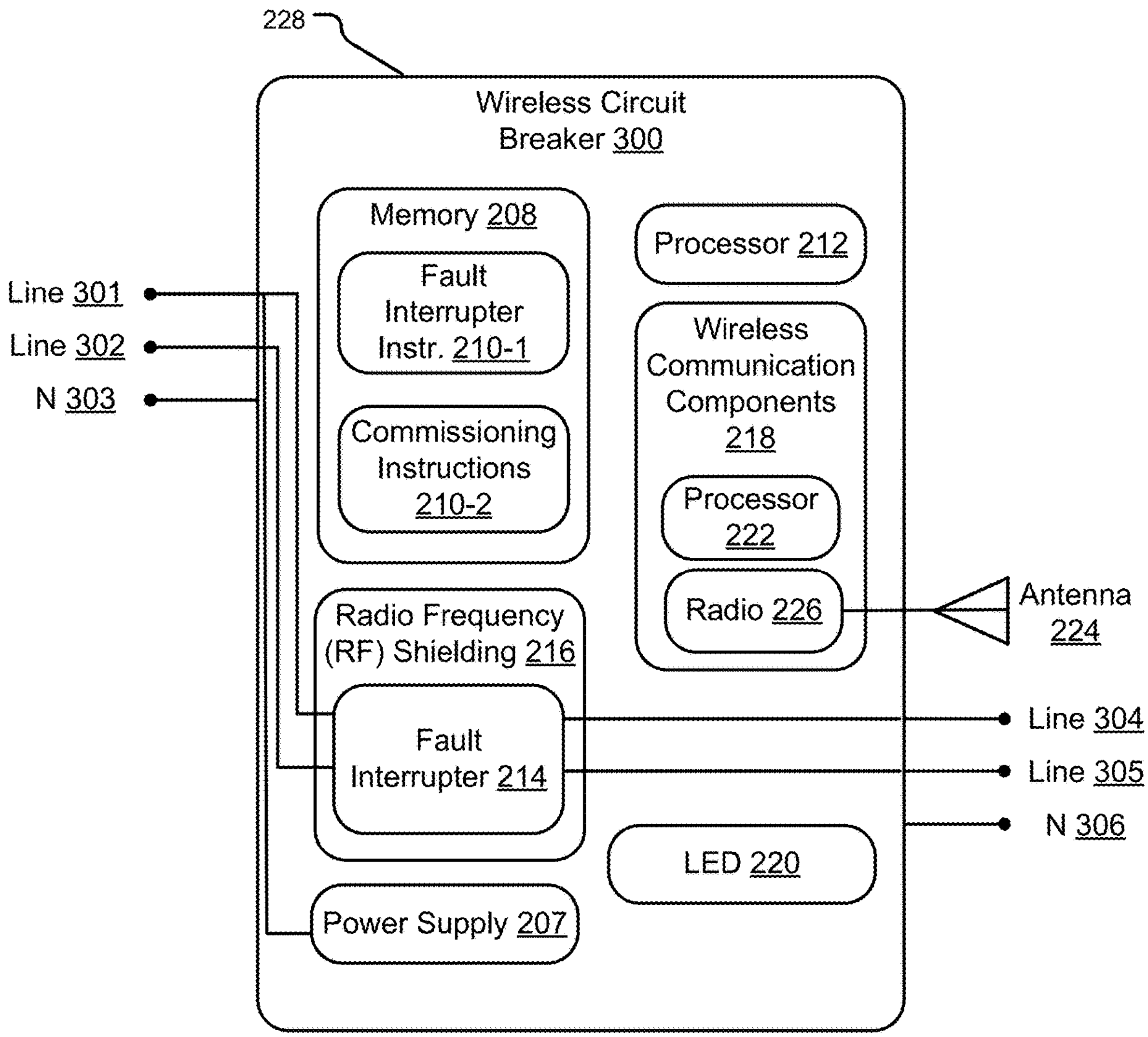
FIG. 3 illustrates a second exemplary embodiment of a communication enabled circuit breaker.

FIG. 3 illustrates a wireless circuit breaker 300 in accordance with another exemplary embodiment. In some examples, the wireless circuit breaker 300 can be implemented as any one of the communication enabled circuit breakers 104-1 to 104-1 of the system 100 of FIG. 1. Generally, the wireless circuit breaker 300 may be used in a wide range of commercial, residential, and industrial circuit breaker panels. The wireless circuit breaker 300 may be configured to operate in conjunction with different electrical power distribution systems, including single-phase, split-phase, 3-phase delta, and 3-phase star. These systems may operate at any suitable voltage such as 120/240 (120V phase-neutral, 240 phase-to-phase), 120/208, 265/460, 277/480. It is noted, wireless circuit breaker 300 includes several similar components to wireless circuit breaker 200, such as memory 208 including fault interrupter instructions 210-1 and commissioning instructions 210-2; processor 212, power supply 207, LED 220; and wireless communications components 218 including processor 222 antenna 224 and radio 226. Such similar components are numbered consistently between FIGS. 2-3. Furthermore, a description of such components is not repeated when describing breaker 300 for purposes of brevity.

The wireless circuit breaker 300 includes line side phase connections 301 and 302, a line side neutral connection 303, load side phase connections 304 and 305, and a load side neutral connection 306. The line side phase connections 301 and 302 and the line side neutral connection 303 are coupled to a power source. The load side phase connections 304 and 305 and the load side neutral connection 306 are coupled to a load. Thus, current can enter the wireless circuit breaker 300 via the line side phase connections 301 and 302, exit the wireless circuit breaker 300 via the load side phase connections 304 and 305, and return to the wireless circuit breaker 300 via the load side neutral connection 306, and travel back to the power source via the line side neutral connection 303. The line side phase connections 301 and 302 and the line side neutral connection 303 may be coupled to a power source (e.g., an electrical grid). The load side phase connections 304 and 305 and the load side neutral connection 306 may be coupled to a load (e.g., HVAC system, refrigerator, TV, etc.).

The power supply 207 receives an input power from one or more of line side phase connections 301 and 302 and the line side neutral connection 303. The power supply 207 converts, in some implementations, an AC voltage to a regulated DC voltage for use by some or all of the electrical components associated with the wireless circuit breaker 300.

Figure 4:
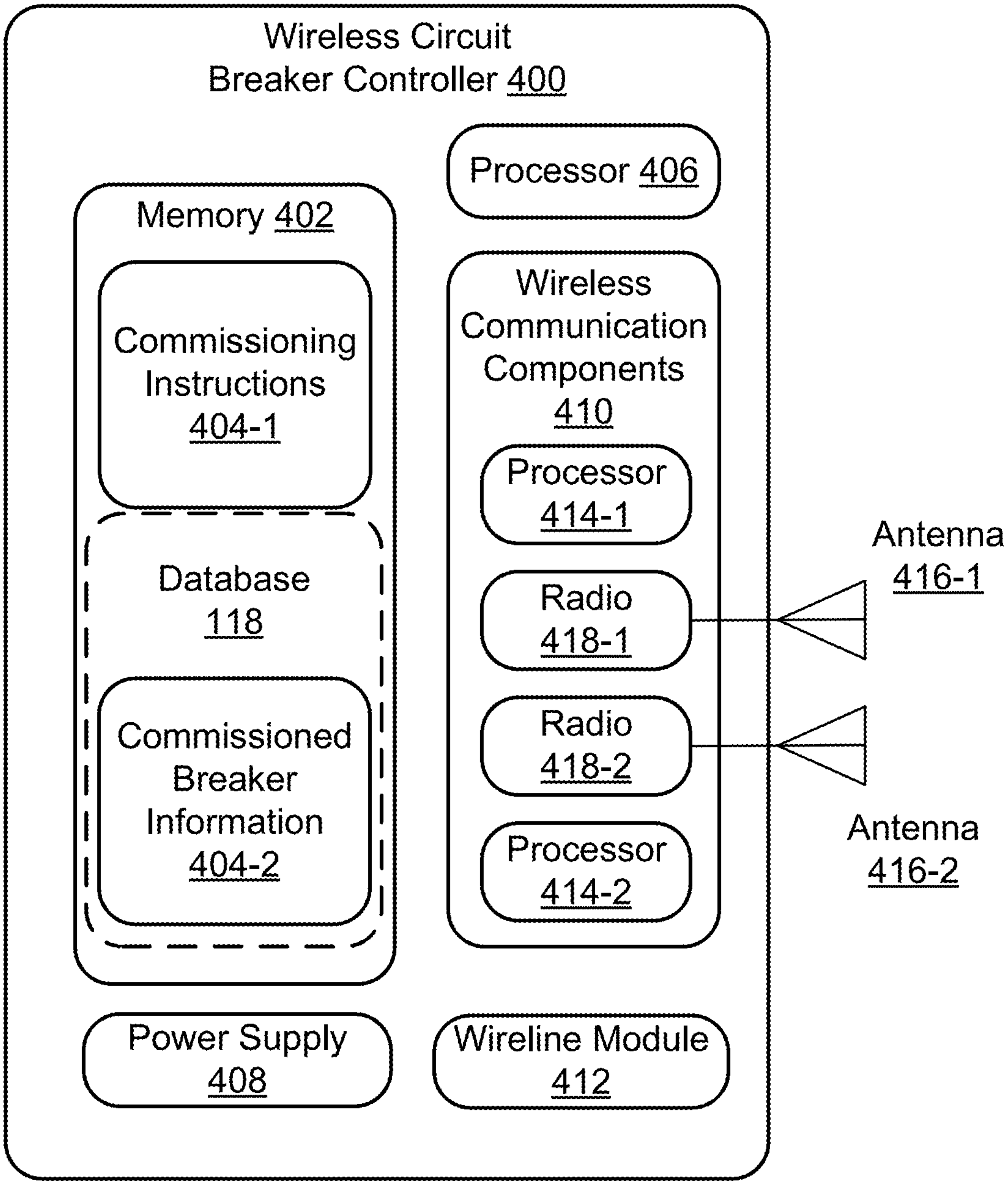
FIG. 4 illustrates a circuit breaker controller in accordance with an exemplary embodiment.

FIG. 4 illustrates a wireless circuit breaker controller 400 in accordance with an exemplary embodiment. In some examples, the wireless circuit breaker controller 400 can be implemented as the circuit breaker controller 106 of the system 100 of FIG. 1. Generally, the wireless circuit breaker controller 400 may be used in a wide range of commercial, residential, and industrial power panels. In some embodiments, the wireless circuit breaker controller 400 can be implemented within a circuit breaker panel (e.g., panel 102) while in other embodiments, the wireless circuit breaker controller 400 can be implemented externally to a panel (e.g., panel 102) and coupled to wireless breakers (e.g., breakers 104-*n*) within the panel. In an alternative implementation, the wireless circuit breaker controller 400 can be implemented as part of a mobile device, such as a mobile phone, having hardware/software functionality to enable the mobile device to function as the described wireless circuit breaker controller 400.

A memory 402 is disposed in the wireless circuit breaker controller 400. The memory 402 is configured to store commissioning instructions 404-1. Furthermore, the memory 402 may be configured to store database 118, which can in some examples, include commissioned breaker information 404-2. The commissioned breaker information 404-2 may form the basis of database 118 including information regarding breakers 104 commissioned, or deployed, in panel 102. The memory 402 may comprise an article of manufacture. In some examples, the memory 402 may include any non-transitory computer readable medium or machine readable medium, such as an optical, magnetic or semiconductor storage. The memory 402 may be one or more memory chips capable of storing data and allowing any storage location to be directly accessed by the processor 406.

The memory 402 may be coupled to a processor 406. Processor 406 could be any of a variety of processors, such as, for example, a central processing unit, a microprocessor, a field programmable gate array, an application specific integrated circuit, or the like. Processor 406 can be arranged to execute instructions stored in the memory 402 to aid in performing one or more techniques described herein. For example, processor 406, in executing commissioning instructions 404-1, can cause controller 400 to pair with breakers 104 and to populate information about breakers 104 in database 118. This is described in greater detail below.

The wireless circuit breaker controller 400 may include a power supply 408. The power supply 408 is to convert, in some implementations, an AC voltage to a regulated DC voltage for use by some or all the electrical components associated with the wireless circuit breaker controller 400.

The wireless circuit breaker controller 400 includes wireless communication components 410. The wireless communication components 410 enable the wireless circuit breaker controller 400 to communicate wirelessly using any suitable type of wireless communication technology (e.g., a short-range wireless/near field wireless technology, Bluetooth®, Wi-Fi®, ZigBee®, etc. Therefore, the wireless communication components 410 may include at least radio 418-1, antenna 416-1, and processor 414-1. In general, the radio 418-1 can be any radio configured to communicate using a wireless transmission scheme, such as, for example, BLE. The antenna 416-1 can be coupled to radio 418-1 and configured to emit and receive RF signals. For example, the antenna 416-1 can emit RF signals received from the radio 418-1 (or a radio front, which is not depicted for clarity) coupled between the radio 418-1 and the antenna 416-1. The antenna 416-1 could be any of a variety of antennas (or antenna arrays) having different shapes and/or configurations arranged to emit/receive radio waves on a particular frequency, range of frequencies, or the like. Processor 414-1 can be any of a variety of processors (e.g., application processor, baseband processors, etc.) arranged to perform at least transmission and reception of wireless signals associated with the wireless circuit breaker controller 400. Furthermore, the antenna 416-1 could be internal to the physical housing or packaging of the breaker controller 400 or external to the physical housing or packing of the breaker controller 400.

As detailed, some embodiments provide wireless communication components 410 of wireless circuit breaker controller 400 are operable to communicate over several wireless frequencies or schemes. As such, processor 414-1, radio 418-1 and antenna 416-1 could be arranged to communicate over multiple wireless communication technologies, such as, for example, BLE and Wi-Fi. In other examples, wireless communication components 410 can include multiple sets of processor, radio and antenna. For example, as depicted, components 410 further include radio 418-2, antenna 416-2 and processor 414-2. Thus, the first set of radio 418-1, antenna 416-1 and processor 414-1 can be arranged to communicate using a first wireless communication scheme, such as, BLE while the second set of radio 418-2, antenna 416-2 and processor 414-2 can be arranged to communicate using a second wireless communication scheme, such as, Wi-Fi. In some examples, the transmission power for radio(s) 418-1 and/or 418-2 can be throttled and/or power limited. For example, radio(s) 418-1 and/or 418-2 transmission power can be throttled to reduce incidence of interference with adjacent devices (e.g., breakers in the panel, devices adjacent to panel, or the like).

The wireless circuit breaker controller 400 may further include a wireline network interface 412. The wireline network interface 412 enables the wireless circuit breaker controller 400 to be coupled via a wireline connection to various devices. For example, in some implementations, the wireless circuit breaker controller 400 is a standalone device that may be wireline connected (e.g., via Ethernet) to a remote device (e.g., Internet cloud 114) and wirelessly connected to wireless breakers (e.g., breakers 104-*n*) within a circuit breaker panel (e.g., panel 102). In such an example, the controller 400 could optionally omit one of the wireless communication components (e.g., wireless communication components 410 arranged to communicate via Wi-Fi, or the like). As another example, the wireless circuit breaker controller 400 could be wireless coupled to wireless circuit breakers (e.g., wireless circuit breaker 200, or the like) via wireless communication components 410 and coupled via a wired communication connection to other communication enabled circuit breakers (not shown) via wireless module 412.

Figure 5:
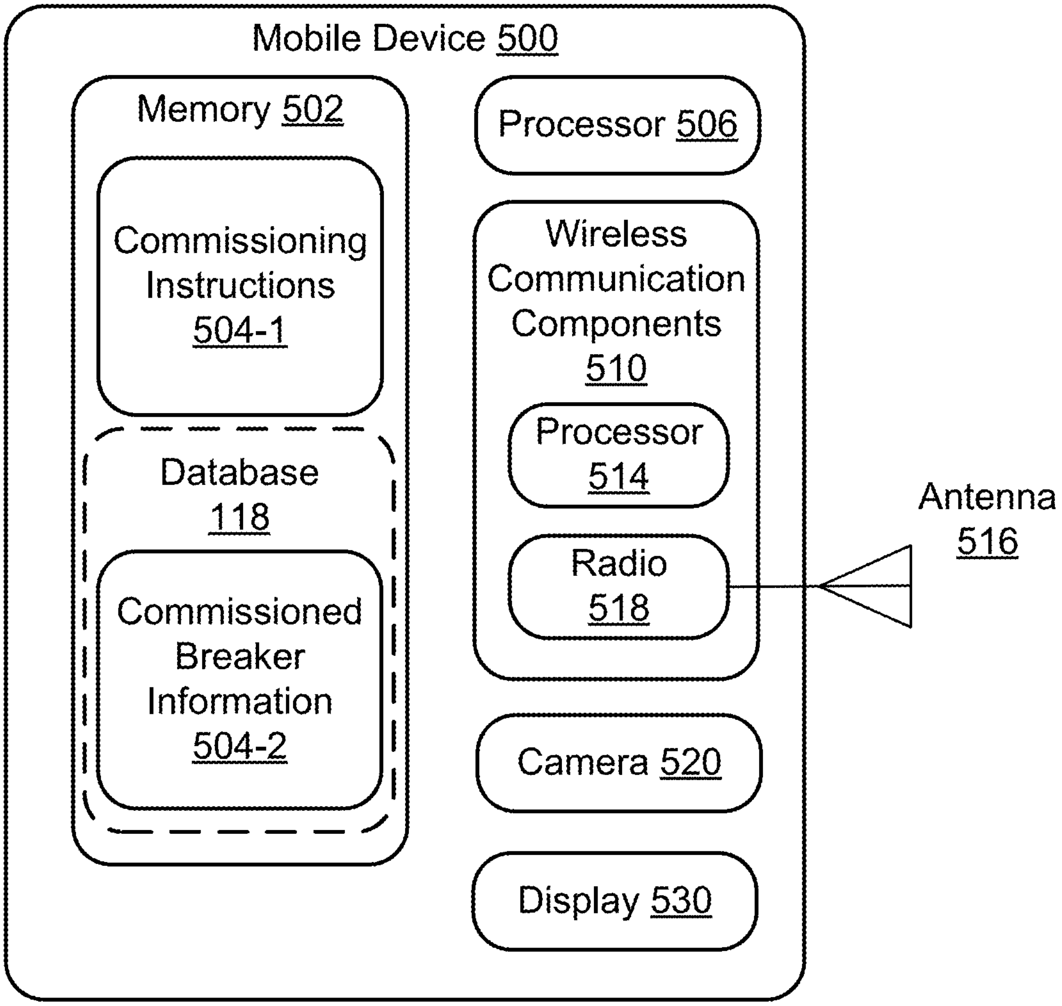
FIG. 5 illustrates a mobile device in accordance with an exemplary embodiment.

FIG. 5 illustrates a mobile device 500 in accordance with an exemplary embodiment. In some examples, the mobile device 500 can be implemented as the mobile device 110 of the system 100 of FIG. 1. In general, the mobile device 500 can be any of a variety of mobile devices, such as, for example, a smart phone, a tablet computer, a laptop computer, or the like. A memory 502 is disposed in mobile device 500. The memory 502 is configured to store commissioning instructions 504-1. Furthermore, the memory 502 may be configured to store database 118, which can in some examples, include commissioned breaker information 504-2. The commissioned breaker information 504-2 may form the basis of database 118 including information regarding communication enabled circuit breakers 104 commissioned, or deployed, in panel 102. The memory 502 may comprise an article of manufacture, such as a non-transitory computer-readable medium.

In some examples, commissioned breaker information 404-2 and 504-2 may comprise indications of the same information. Furthermore, with some examples, database 118, including commissioned breaker information 404-2 and/or 504-2 can be stored on a server accessible via the Internet 114. For example, database 118 can be stored to a server accessible via the Internet as part of the example commissioning processes detailed herein. However, for purposes of clarity, database 118 is depicted stored in memory of either controller 400 or mobile device 500. Examples are not limited in this context.

The memory 502 may be coupled to a processor 506. Processor 506 could be any of a variety of processors, such as, for example, a central processing unit, a microprocessor, a field programmable gate array, an application specific integrated circuit, or the like. Processor 506 can be arranged to execute instructions stored in the memory 502 to aid in performing one or more techniques described herein. For example, processor 506, in executing commissioning instructions 504-1, can cause mobile device 500 to receive information elements from a controller (e.g., controller 106, or the like) and/or breakers (e.g., breakers 104, or the like) and populate database 118 based on the received information elements and/or additional breaker information received, for example, via an input device (e.g. camera 520, touch display 530, or the like).

The mobile device 500 may further include camera 520 and display 530. Camera 520 can be any of a variety of cameras arranged to capture an image, such as, for example, a digital camera including an optical sensor arranged to capture light and convert the light to images. Display 530 can be any of a variety of displays arranged to manipulate light to display and/or project an image and may include touch functionality. Furthermore, mobile device 500 can include several components not depicted, such as, for example power supplies, batteries, graphics processing units, speakers, input controls, or the like.

FIGS. 6-9 illustrate techniques, implementable by a communication enabled circuit breaker and panel system, such as, the system 100 of FIG. 1. In general, these logic flows can be implemented by any communication enabled circuit breaker and panel system or component(s) of such a system, such as, the system 100, breaker(s) 104-*n*, controller 106, remote entity 120, breaker 200, breaker 300, controller 400, mobile device 500 and/or the like. The following description of FIGS. 6-9 breakers 200, controller 400 and mobile device 500 for purposes of convenience and clarity only. However, it is to be understood that the logic flows described could be implemented by different combinations of components of a wireless circuit breaker and panel system without departing from the spirit and scope of the claimed subject matter.

Figure 6:
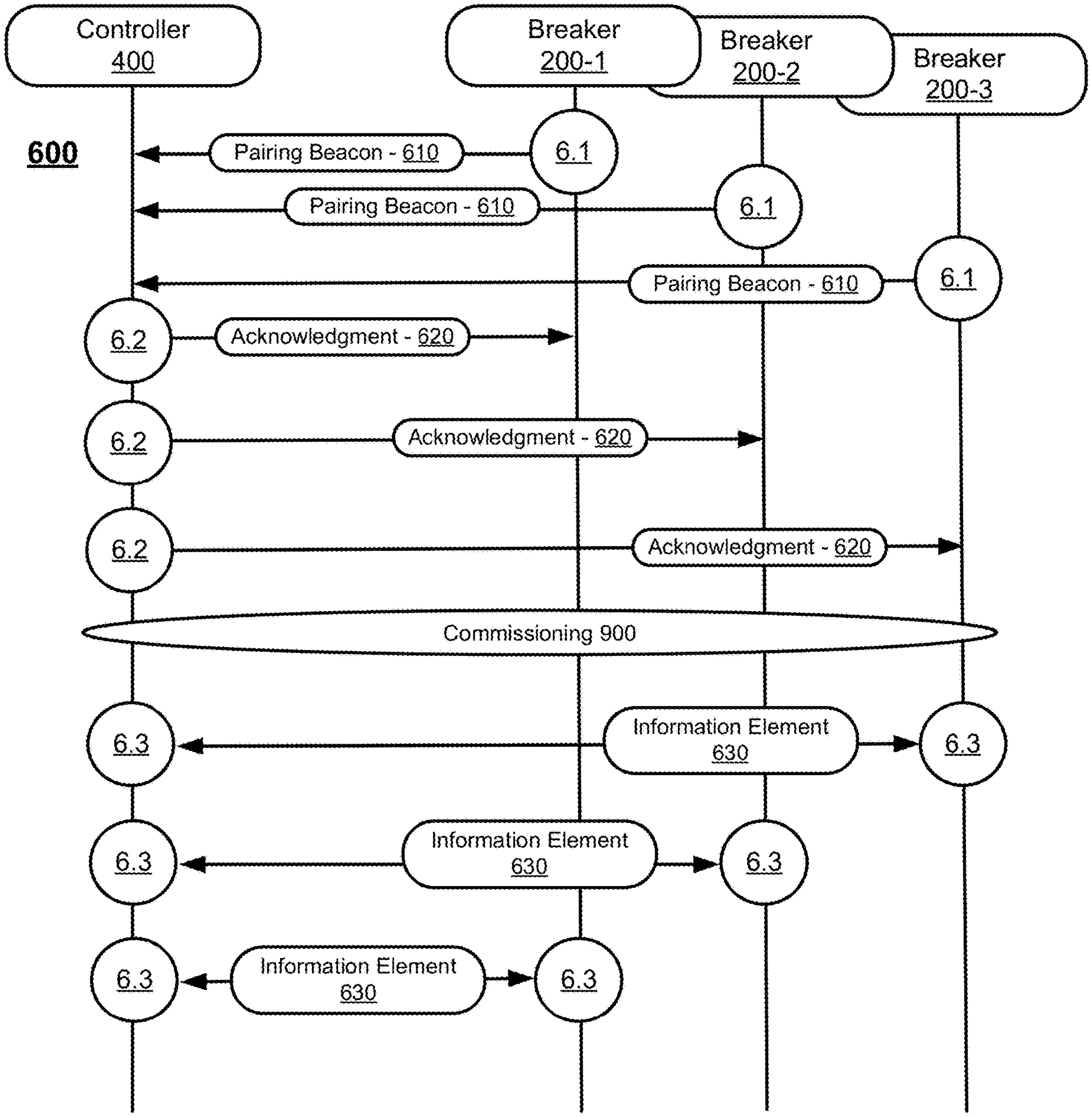
FIG. 6 illustrates a first exemplary embodiment of a technique to commission a panel including communication enabled circuit breakers.
Figure 7:
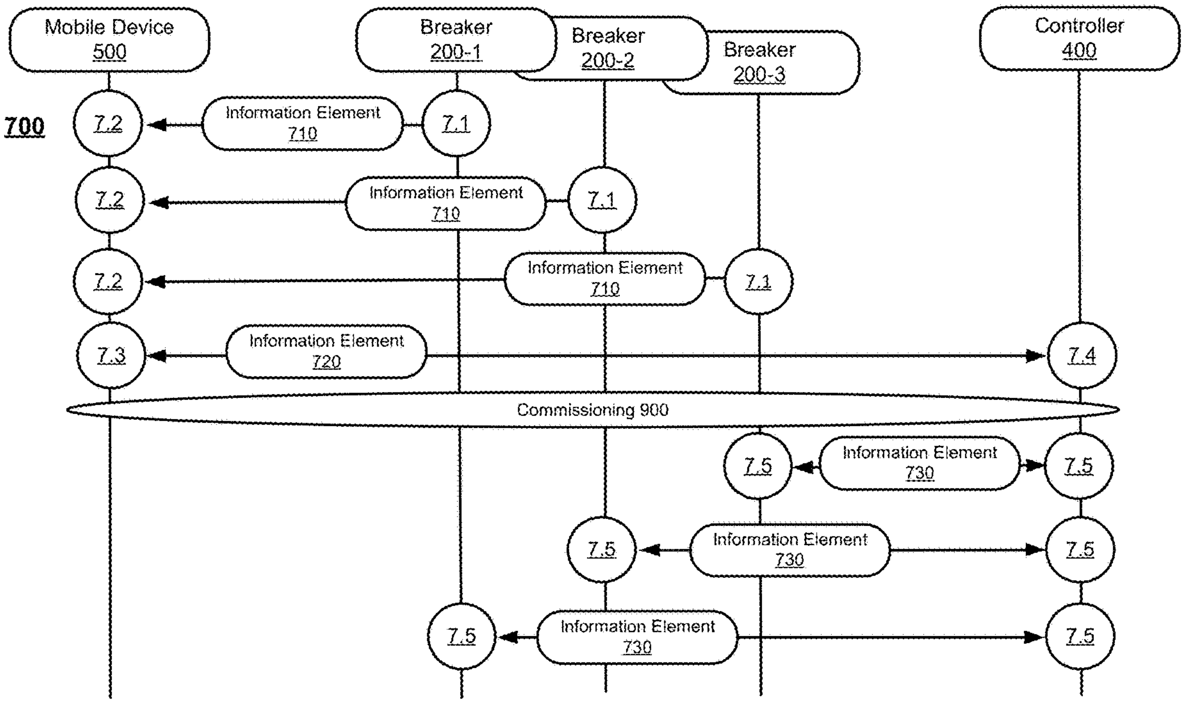
FIG. 7 illustrates a second exemplary embodiment of a technique to commission a panel including communication enabled circuit breakers.
Figure 8:
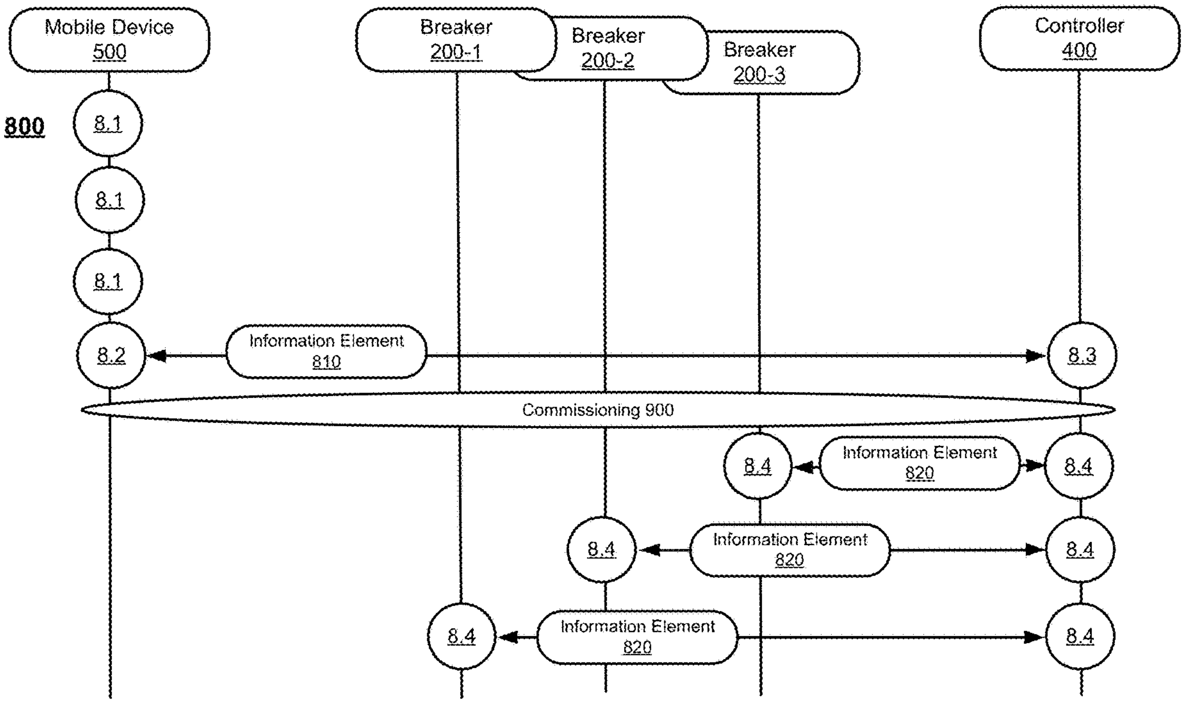
FIG. 8 illustrates a third exemplary embodiment of a technique to commission a panel including communication enabled circuit breakers.
Figure 9:
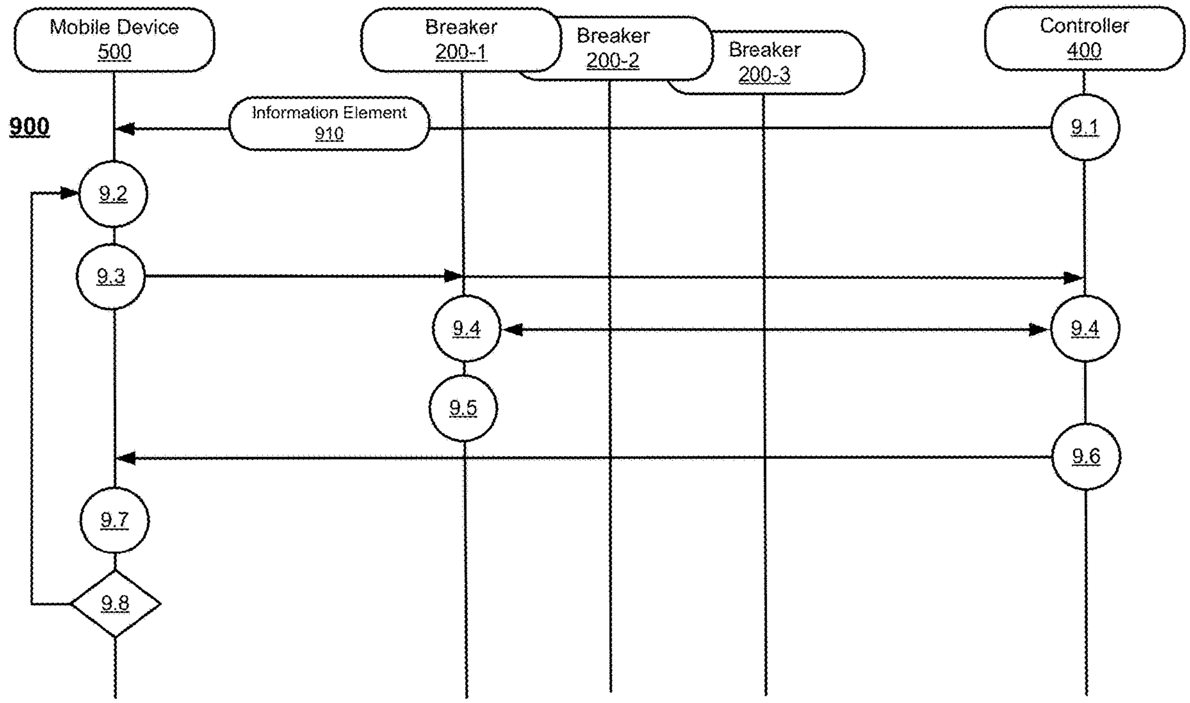
FIG. 9 illustrates a fourth exemplary embodiment of a technique to commission a panel including communication enabled circuit breakers.

In general, commissioning a panel, such as, panel 102, is a multi-step process that involves both pairing individual breakers 200 with the controller 400 and populating a database (e.g., database 118) with information about the individual breakers. For example, each of the breakers 200 needs to be paired with the controller 400. Furthermore, each of the breakers 200 can be commissioned and parameters, settings, or characteristics related to each breaker established in database 118. The database 118, might be maintained in the controller 400, on a server accessible over the Internet 114, or the like. FIGS. 6-8 depict example techniques to pair breakers 200 to the controller 400 as well as commission the breakers while FIG. 9 depicts an example technique to finalize the commissioning of the breakers 200.

FIG. 6 depicts a technique 600 to provision a circuit breaker panel with wireless communication enabled circuit breakers. The technique 600 may start at circle 6.1. At circle 6.1, any number of breakers 200 can broadcast pairing beacons 610. Each pairing beacon 610 may also include an authentication key (more on this below). For example, this figure depicts breakers 200-1, 200-2, and 200-3, each broadcasting a pairing beacon 610 at circle 6.1. In some examples, at circle 6.1, each breaker 200 can periodically broadcast a pairing beacon 610. With some examples, breakers 200 can initiate periodic broadcasting of pairing beacons after a delay, which may be determined based on a random number, based on a unique identifier associated with each breaker, or the like. For example, upon initialization (or initial power up) of a panel including several breakers 200 (e.g., panel 102 of FIG. 1, or the like), each breaker 200 may begin broadcasting paring beacon 610. Said differently, upon initial startup, or when breakers 200 have not otherwise or are not currently paired with controller 400, breakers 200 may begin broadcasting paring beacons 610, as at circle 6.1.

In some embodiments, at circle 6.1, breakers 200-1 to 200-3 can calculate a delay to apply prior to starting periodic broadcasting of paring beacon 610. Said differently, breakers 2300 can determine a delay time, or a time to delay initiating broadcasting of pairing beacons. For example, breakers 200-1 to 200-3 can determine the delay based on a random number and/or a unique identifier of the breaker. For example, at detailed in FIGS. 2-3, breaker 200 comprises several hardware components, each of which may have a unique identification number. For example, processor 212, processor 222, radio 226, or the like may each have a unique identification number set at manufacturing. Processor 212, in executing commissioning instructions 210-2, can generate a random number and delay broadcasting pairing beacon 610 an amount of time corresponding to the generated random number. In some examples, processor 212, in executing commissioning instructions 210-2, can delay broadcasting pairing beacon 610 an amount of time corresponding to the unique identification number. In some examples, processor 212, in executing commissioning instructions 210-2, can generate a random number and can delay broadcasting pairing beacon 610 an amount of time corresponding to a product of the generated random number and the unique identification number. In some examples, processor 212, in executing commissioning instructions 210-2, can generate multiple random numbers and can determine the delay based on a calculation using the multiple random numbers (e.g., sum, product, or the like). In some examples, processor 212, in executing commissioning instructions 210-2, can generate one or more random numbers using the unique identifier number as a seed to the random number generator.

In general, pairing beacon 610 can include indications of an address of the breaker 200 broadcasting the pairing beacon 210. In some examples, pairing beacon 610 can also include a device access code (DAC) and/or an inquiry access code (IAC) to enable establishing a link between the broadcasting breaker 200 and the controller 400, such as, for example, in accordance with the Bluetooth Core Specification (e.g., Bluetooth Specification Version 4.2, 5.0, or the like).

Continuing to circle 6.2, controller 400 can receive broadcast pairing beacon(s) 610 and can add a descriptor or indication, of the breaker(s) 200 corresponding to the received broadcast pairing beacon(s), to a white list of breakers. Furthermore, controller 400 can send an acknowledgement 620 to breakers 200 to include an indication to stop broadcasting pairing beacons 610. For example, at circle 6.2, controller 400 can receive a pairing beacon 610 from one of breakers 200 (e.g., 200-1, 200-2, 200-3, or the like); add a descriptor of the breaker 200 to a white list (e.g., commissioned breaker information 404-2, or the like); and can send acknowledgement 620 to the respective breaker 200. Upon receipt of the acknowledgment, the respective breaker can stop broadcasting pairing beacon 610. Said differently, each breaker 200 may continue to repeatedly (e.g., on a set period after the initial delay, or the like) broadcast pairing beacons 610 until the respective breaker 200 receives an acknowledgment or "quiet command" from circuit breaker controller 400.

Upon receipt of all pairing beacons 610, or upon expiration of a threshold amount of time without receiving a pairing beacon 610, controller 400 can proceed to commission the breakers. Said differently, circuit breaker controller 400 can continue to receive pairing beacons and add breakers 200 to the whitelist of breakers to pair until no pairing beacons are being broadcast. At which point, controller 400 can continue to commission the breakers 200 based on technique 900 described in FIG. 9. Upon commissioning of breakers 200, technique 600 can continue to circle 6.3. At circle 6.3 breakers 200 and controller 400 can communicate information elements 630, for example, via BLE, including indications of status of the breakers 200, updates from controller 400 to breakers 200, or the like.

In some examples, controller 400 can periodically, or continually, "listen" for broadcast pairing beacons. For example, controller 400 could continually perform circle 6.2. In other examples, controller 400 can perform circle 6.2 upon receiving a command to initiate pairing operations.

FIG. 7 depicts a technique 700 to provision a circuit breaker panel with wireless communication enabled circuit breakers. The technique 700 may start at circle 7.1. At circle 7.1, any number of breakers 200 can broadcast information elements 710 including indications of an address of the breaker 200 broadcasting the pairing information element 710. In some examples, information elements 710 can further include a device access code (DAC) and/or an inquiry access code (IAC) to enable establishing a link between the broadcasting breaker 200 and the controller 400, such as, for example, in accordance with the Bluetooth Core Specification (e.g., Bluetooth Specification Version 4.2, 5.0, or the like).

In some examples, information elements 710 can be transmitted by breakers 200 and/or received by mobile device 500 via various wireless communication protocols, such as, for example, near filed communication (NFC), BLE, WiFi, or the like. In some examples, breakers 200 can illuminate an LED (e.g., LED 220) in a pattern sufficient to communicate information elements 710. Mobile device 500 can capture the illuminating LED (e.g., via a camera, via a video recording, or the like) and can receive the information element 710. For example, based on decoding a pattern illuminated by LED 220, mobile device 500 can receive information element 710.

At block 7.3 mobile device 500 can send an information element 720 to controller 400. For example, mobile device 500 can communicate with controller 400 via WiFi (e.g., peer-to-peer WiFi, or the like) and can communicate information element 720 including indications of information elements 710 received at circle 7.2. For example, mobile device 500 can send information element 720 to controller 400 to include breaker 200 device addresses, as well as DAC and/or IAC for breakers 200.

At block 7.4, controller 400 can receive information element 720 and can add descriptions of breakers 200 (e.g., breaker 200-1, breaker 200-2, breaker 200-3, or the like) to a whitelist of breakers to commission (e.g., commissioned breaker information 404-2, or the like). Upon receipt of information element 720 at circle 7.4, controller 400 can commission the breakers. For example, controller 400 can continue to commission the breakers 200 based on technique 900 described in FIG. 9. Alternatively, with some examples, mobile device 500 can directly pair breakers 200 with controller 400. For example, mobile device 500 may establish a pairing relationship between breakers 200 and controller 400 (e.g., as described with respect to technique 900 of FIG. 9) and share and/or provide details of the pairing relationship with controller 400 such that controller 400 inherits the pairing relationship.

Upon commissioning of breakers 200, technique 700 can continue to circle 7.5. At circle 7.5 breakers 200 and controller 400 can communicate information elements 730, for example, via BLE, including indications of status of the breakers 200, updates from controller 400 to breakers 200, or the like.

FIG. 8 depicts a technique 800 to provision a circuit breaker panel with wireless communication enabled circuit breakers. The technique 800 may start at circle 8.1. At circle 8.1, mobile device 500 can receive input and/or capture an indication of an address of the breaker(s) 200 (e.g., breaker 200-1, breaker 200-2, breaker 200-3, or the like). In some examples, mobile device can capture an image (e.g., via camera 520, or the like) of a unique identifier physically visible on breaker 200 (e.g., a QR code, a manufacture specific ID number, or the like). Mobile device 500 can determine a wireless (e.g., Bluetooth, or the like) address and optionally, a device access code (DAC) and/or an inquiry access code (IAC) to enable establishing a link between the respective breaker 200 and the controller 400, such as, for example, in accordance with the Bluetooth Core Specification (e.g., Bluetooth Specification Version 4.2, 5.0, or the like). In some examples, mobile device 500 can receive (e.g., via a user interface or the like) input including an indication of a wireless (e.g., Bluetooth, or the like) address and optionally, a device access code (DAC) and/or an inquiry access code (IAC) to enable establishing a link between the respective breaker 200 and the controller 400. For example, an installer may input such information into a user interface provided on a display (e.g., display 530, or the like) of mobile device 500.

At block 8.2 mobile device 500 can send an information element 810 to controller 400. For example, mobile device 500 can communicate with controller 400 via WiFi (e.g., peer-to-peer WiFi, or the like) and can communicate information element 810 including indications of device addresses of breakers 200 and optionally, DACs and/or IACs.

At block 8.3, controller 400 can receive information element 810 and can add descriptions of breakers 200 (e.g., breaker 200-1, breaker 200-2, breaker 200-3, or the like) to a whitelist of breakers to commission (e.g., commissioned breaker information 404-2, or the like). Upon receipt of information element 810 at circle 8.3, controller 400 can commission the breakers. For example, controller 400 can continue to commission the breakers 200 based on technique 900 described in FIG. 9. Upon commissioning of breakers 200, technique 800 can continue to circle 8.4. At circle 8.4 breakers 200 and controller 400 can communicate information elements 820, for example, via BLE, including indications of status of the breakers 200, updates from controller 400 to breakers 200, or the like.

FIG. 9 depicts a technique 900 to commission a circuit breaker panel with wireless communication enabled circuit breakers. The technique 900 may start at circle 9.1. At circle 9.1, mobile device 500 can receive an information element 910 from controller 400 including indications of breaker 200 with which controller 400 can pair. In some embodiments, mobile device 500 can communicate with controller 400 over a wireless peer-to-peer link (e.g., WiFi Direct, of the like). In some examples, information element 910 includes an indication of breakers 200 with which controller 400 received pairing beacons (e.g., as in technique 600 of FIG. 6, or the like).

Continuing to circle 9.2, mobile device 500 can select one of breakers 200 indicated in information element 910 with which to commission. In some examples, mobile device 500 can present a list of breakers 200 indicated in information element 910 on a display (e.g., display 530, or the like) and can receive an indication of one of the listed breakers 200 to select. For example, an installer of panel system 102 can select one of the listed breakers to commission. In some examples, information element 910 can include an indication of a serial number of other indicator for breakers 200 which is physically visible on a housing of breakers 200. As such, an installer can select a specific breaker from the list based on the visible indicator on the housing of the breaker and the displayed list.

Continuing to block 9.3, mobile device 500 can send a control signal to the selected breaker (e.g., breaker 200-1, or the like) and/or controller 400 including an indication to complete the pairing process. In some examples, at block 9.3, mobile device 500 sends the control signal to controller 400 which initiates completing of the pairing process with the selected breaker 200. For example, this figure depicts breaker 200-1 selected and paring with controller 400. Continuing to block 9.4, controller 400 and the selected breaker 200-1 can complete the pairing process. In some examples, controller 400 can generate encryption keys and complete the pairing process by validating the received DAC and/or IAC with breaker 200-1, establish the wireless communication channel based on an assigned channel ID, and exchanging encryption keys to use for subsequent wireless communication. In some examples encryption keys can be generated based on the wireless address of the breaker, the DAC, the IAC, and/or any of a variety of encryption schemes (e.g., PGP encryption, ECDH encryption, or the like). Each controller 400 includes a block of code, a public encryption key and a private encryption key. The public encryption key and a private encryption key, taken together, form an encryption key pair. The public and private encryption keys are each generated based on different operations performed on the same block of code.

Likewise, each breaker 200 includes a block of code, a public encryption key and a private encryption key. The public encryption key and a private encryption key, taken together, form an encryption key pair. The public and private encryption keys are each generated based on different operations performed on the same block of code.

The public encryption key of the controller 400 is shared with the breaker 200. Likewise, the public encryption key of the breaker 200 is shared with the controller 400.

When the public encryption key of the breaker 200 is shared with the controller 400, the controller generates a random number (via an encryption algorithm such as PGP, ECDH, or other suitable algorithm) based on its own private key and the public key of the breaker 200. The controller 400 then sends the random number to the breaker 200. The breaker 200 uses this random number, via an algorithm, to calculate the private key of the controller.

When the public encryption key of the controller 400 is shared with the breaker 200, the breaker 200 generates a random number (via an encryption algorithm) based on its own private key and the public key of the controller 400. The breaker 200 then sends the random number to the controller 400. The controller 400 uses this random number, via an algorithm, to calculate the private key of the breaker 200.

Once the controller 400 and the breaker 200 have exchanged public keys and calculated private keys, then an encrypted communication channel is established between the controller 400 and the breaker 200. Once the encrypted communication channel is established, an authentication process is initiated. Having received the authentication key as part of the broadcast pairing beacon 610, the controller 400 then decrypts the authentication key using an CCM, or other suitable, encryption algorithm. Controller 400 then transmits the decrypted authentication key back to the breaker 200 via the encrypted communication channel. In this manner, the controller 400 and the breaker 200 are authenticated with each other. It is noted, that with some examples, the authentication process and encrypted communication channel can be initialized prior to commissioning the breaker. As such, the commissioning process can utilize the secure communication channel. Additionally, the secure communication channel can be utilized to communication between the breakers and controller 400 post commissioning. If the authentication fails, new authentication keys are generated and broadcasted during the next broadcast pairing beacon 610. During this subsequent broadcast pairing beacon 610, the new authentication key will be used as opposed to the previously generated authentication key.

Continuing to circle 9.5, the selected breaker can be arranged to physical indicate a completion of the paring process. For example, breaker 200-1 can be arranged to flash LED 220 based on completing the paring process at circle 9.4. Continuing to block 9.6, controller 400 can send a control signal to mobile device 500 including an indication of a confirmation of completion of pairing with the selected breaker 200.

Continuing to block 9.7, mobile device 500 can populate entries in database 118 with information about the selected breaker 200. For example, mobile device 500 can assign a position within panel (e.g., position 1, position 2, position 3, etc.), assign a name (e.g., master bedroom, kitchen, range, HVAC, etc.), detail other characteristics of the breaker (e.g., AFCI, GFCI, breaking capacity, voltage rating, model number, firmware version, manufacturer, serial number, etc.), which can be added to commissioned breaker information 404-2 in database 118. In some examples, mobile device 500 can capture an image of panel 102 and/or breakers 200 to populate such entries in database 118. For example, mobile device 500 can capture an image of panel 102 with breakers 102 deployed therein and can determine a position within panel 102 of the selected breaker, for example, based on the selected breaker flashing an LED while the image is captured, based on a serial number visible on breaker 200, or the like. Such information (e.g., column, row, column and row, or the like) of the location of breaker 200 in panel 102 can be added to database 118.

Continuing to decision diamond 9.8, mobile device 500 can determine whether to commission another breaker 200. For example, mobile device 500 can determine to commission another breaker based on determining that more breakers 200 indicated in information element 910 remain uncommission. Based on a determination that more breakers 200 are to be commissioned, technique 900 can return to circle 9.2. For example, mobile device 500 could determine that breakers 200-2 and 200-3 remain uncommissioned (e.g., breaker 200-2, breaker 200-3, etc.) but were indicated in information element 910 are ready to pair with controller 400. As such, mobile device 500 could update the list previously displayed at circle 9.2 (e.g., remove fully commissioned breakers, or the like), redisplay the list, and proceed as detailed above.

Figure 10:
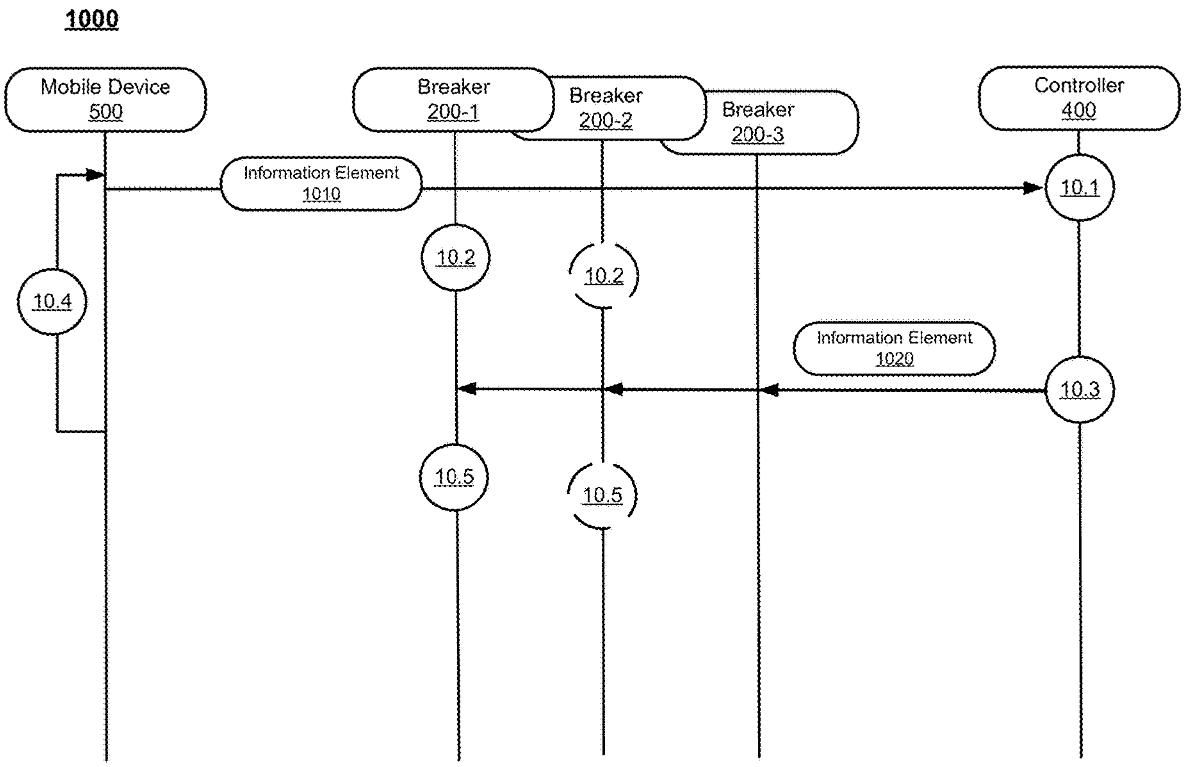
FIG. 10 illustrates a fourth exemplary embodiment of a technique to decommission a panel including communication enabled circuit breakers.

FIG. 10 depicts a technique 1000 to decommission wireless communication circuit breaker(s) from a panel system. Said differently, technique 1000 can be implemented to disassociated a number of wireless communication enabled circuit breakers from a panel system. In general, once the wireless communication enabled circuit breakers are commissioned to a panel system and paired to a controller within the panel system, the breakers will only communicate with the controller in the panel system to which they were commissioned (or paired). As a result, if it is desired to remove the breaker from the panel (e.g., to troubleshoot it, install it into another panel, or the like) the breaker will need to be "decommissioned" or "unpaired" from the controller before it will be able to communicate with another panel or system.

Technique 1000 can be used to decommission breaker(s). The technique 1000 may start at circle 10.1. At circle 10.1, mobile device 500 can send an information element 1010 to controller 400 including an indication to decommission breakers. In some embodiments, mobile device 500 can communicate with controller 400 over a wireless peer-to-peer link (e.g., WiFi Direct, of the like). In some examples, mobile device 500 can be a device in the cloud accessing controller, for example, via the Internet.

Continuing to circle 10.2, any number of breakers 200 can be transitioned between an ON and OFF state. For example, if the breaker is in the ON state, it must be turned OFF and then ON. If the breaker is in the mid-tripped state or the OFF state, it must be turned ON, then OFF, then ON again. As depicted in this figure, breakers 200-1 and 200-2 are indicated as transitioning between the ON and OFF states at circle 10.2. Thus, breakers 200-1 and 200-2 would be decommissioned from controller 400. However, breaker 200-3 is not depicted as transitioning between the ON and OFF states at circle 10.2. Thus, breaker 200-3 would not be decommissioned from controller 400 but would remain commissioned to controller 400.

Continuing to circle 10.3, controller 400 can send an information element 1020 to breakers 200 including an indication to decommission breakers 200 that transitioned from the ON to OFF state (e.g., at circle 10.2). In some embodiments, circles 10.1 to 10.3 need to be completed within a specified time period 10.4 for decommissioning to be accepted. For example, circles 10.1 to 10.3 may need to be completed within a 15 second time period, a 30 second time period, a 45 second time period, a 60 second time period, or the like. Continuing to circle 10.5, breakers receiving a decommissioning signal (e.g., information element 1020) at circle 10.3 and having transitioned from an ON to an OFF state at circle 10.2 are decommissioned from panel 400. As depicted in this figure, breakers 200-1 and 200-2 are indicated as transitioning between the ON and OFF states at circle 10.2 and receiving decommissioning signals 1020 at circle 10.3 within time period 10.4. Thus, breakers 200-1 and 200-2 would be decommissioned from controller 400. However, breaker 200-3 is not depicted as transitioning between the ON and OFF states at circle 10.2, even though breaker 200-3 is depicted as receiving decommissioning signal 1020 at circle 10.3. Thus, breaker 200-3 would not be decommissioned from controller 400 but would remain commissioned to controller 400. It is important to note, that decommissioning signal 10.3 need not original from a controller to which breakers 200 are commissioned. For example, a breaker could be removed from a panel system without decommissioning and then could be decommissioned by another panel system and controller via the same technique illustrated in this figure.

As an alternative method to decommission a breaker, a controller can issue decommissioning commands directly to a commissioned breaker. For example, controller 400 could send information element 1020 to one of breakers 200 (e.g., breaker 200-1) including an indication to unpair from controller 400. Upon receipt of information element 1020, the breaker 200 (e.g., breaker 200-1) would decommission (e.g., circle 10.5), even without transitioning from the ON to OFF state.

Figure 11:
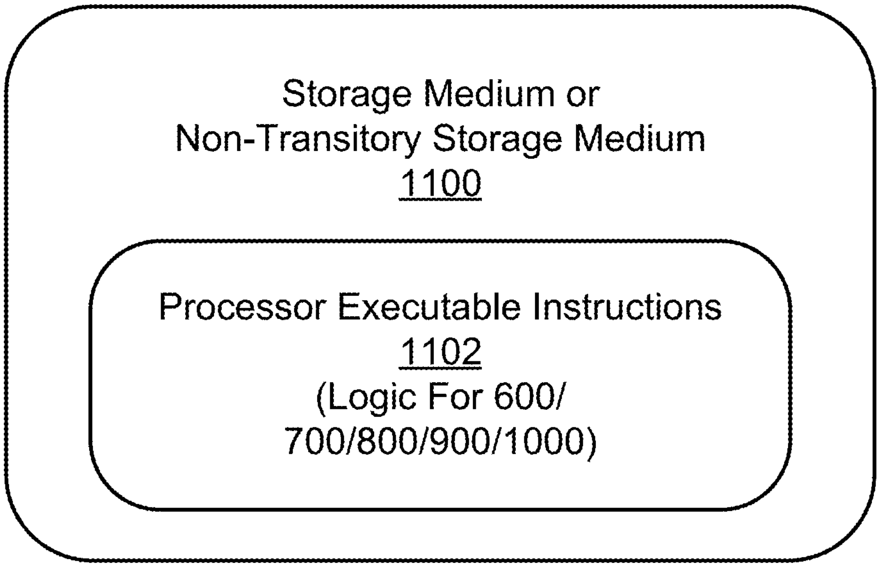
FIG. 11 illustrates a storage medium according to an exemplary embodiment.

FIG. 11 illustrates an embodiment of a storage medium 1100. The storage medium 600 may comprise an article of manufacture. In some examples, the storage medium 1000 may include any non-transitory computer readable medium or machine readable medium, such as an optical, magnetic or semiconductor storage. The storage medium 1100 may store various types of processor executable instructions e.g., 1102 executable by a processor (e.g., processor 212, processor 222, processor 406, processor 414-1, processor 414-2, processor 506, processor 514, etc.). Storage medium 1102 may store processor executable instructions 1002, which when executed by a processor can cause the processor to implement any one or more of techniques 600, 700, 800, 900 and/or 1000.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

While a wireless circuit breaker, a wireless circuit breaker controller, wireless technology enabled circuit breakers and methods for using the same have been described regarding certain embodiments, it will be understood by those skilled in the art that various changes may be made and equivalents may be substituted without departing from the spirit and scope of the claims of the application. Other modifications may be made to adapt a situation or material to the teachings disclosed above without departing from the scope of the claims. Therefore, the claims should not be construed as being limited to any one of the embodiments disclosed, but to any embodiments that fall within the scope of the claims.

Furthermore, the following examples are provided to more fully described the embodiments of the present disclosure:

Example 1. A method for commissioning a communicating circuit breaker, comprising: energizing the circuit breaker; electronically retrieving a unique identifier of the circuit breaker; calculating a delay time based on the unique identifier; periodically broadcasting a pairing beacon after the delay time has lapsed until a quiet command is received from a controller; receiving a channel ID assignment from the controller; receiving an encryption key pair from the controller; initializing secure communication with the controller using the encryption key pair across the assigned channel ID; receiving a device information command from the controller; and transmitting device information from the circuit breaker to the controller.

Example 2. The method of example 1, the unique identifier comprising a serial number of a wireless radio or a serial number of a processor.

Example 3. The method of example 1, the pairing beacon comprising an indication of at least one of an address of the circuit breaker, a device access code, or an inquiry access code.

Example 4. The method of any one of examples 1 to 3, calculating the delay based on the unique identifier comprising: generating a first random number; generate a second random number, wherein the unique identifier is a seed for the generation of the first and the second random numbers; and deriving the delay based on a sum of the first and the second random numbers.

Example 5. A method for commissioning a communicating circuit breaker, comprising: receiving, from a communicating breaker, a pairing beacon; sending a quiet command to the communicating breaker to cause the communicating breaker to cease broadcasting the paring beacon; sending a channel ID assignment to the communicating breaker; receiving an encryption key pair from the communicating breaker; initializing secure communication with the communicating breaker using the encryption key pair across the assigned channel ID; sending a device information command to the communicating breaker; and receiving device information from the communicating breaker in response to the sent device information command.

Example 6. The method of example 5, the pairing beacon comprising an indication of at least one of an address of the circuit breaker, a device access code, or an inquiry access code.

Example 7. The method of any one of example 5 or 6, comprising receiving the pairing beacon via a wireless communication.

Example 8. The method of example 7, wherein the wireless communication is Bluetooth, Bluetooth Low Energy, ZigBee, near field communication, or WiFi.

Example 9. The method of any one of example 5 or 6, receiving an encryption key pair comprising receiving a public key of an encryption key pair.

Example 10. The method of any one of examples 5 or 6, wherein the encryption key pair is generated based in part on the pretty good privacy (PGP) encryption scheme or the elliptic-curve diffie-hellman (ECDH) encryption scheme.

Example 11. A method for commissioning a communicating circuit breaker, comprising: receiving, from a communicating breaker, a pairing beacon; sending a quiet command to the communicating breaker to cause the communicating breaker to cease broadcasting the paring beacon; capturing a location of the communicating breaker in a panel; sending pairing information for the communicating breaker to a circuit breaker controller, the pairing information based in part on the pairing beacon and the captured location; and sending a command to the circuit breaker controller to cause the circuit breaker controller to pair with the communicating breaker using, in part, the pairing information.

Example 12. The method of example 11, capturing a location of the communicating breaker comprising: sending a command to the communicating breaker to cause the communicating breaker to illuminate a light emitting diode (LED); taking a picture of a panel comprising the communicating breaker; and determining a column and row of installation of the communicating breaker from the picture based on the illuminated light emitting diode.

Example 13. The method of any one of examples 11 or 12, comprising: receiving a pairing beacon from each of one or more additional communicating breakers; and sending a quiet command to each of the one or more additional communicating breaker to cause the one or more additional communicating breakers to cease broadcasting the paring beacons.

Example 14. The method of example 13, comprising: generating a whitelist of communicating breaker comprising the communication breaker and the one or more additional communicating breakers; and sending an indication of the whitelist to the circuit breaker controller.

Example 15. A circuit breaker, comprising: a wireless radio; a processor coupled to the wireless radio; and a memory coupled to the processor, the memory comprising commissioning instructions, which when executed by the processor, cause the wireless radio to broadcast a pairing beacon after a delay calculated based on a random number and a unique identifier of the circuit breaker.

Example 16. The circuit breaker of example 15, the unique identifier comprising a serial number of the wireless radio or a serial number for the processor.

Example 17. The circuit breaker of example 15, the pairing beacon comprising an indication of at least one of an address of the circuit breaker, a device access code, or an inquiry access code.

Example 18. The circuit breaker of example 15, the circuit breaker comprising a light emitting diode (LED), the memory further comprising commissioning instructions, which when executed by the processor cause the processor to illuminate the LED.

Example 19. The circuit breaker of example 15, the memory further comprising commissioning instructions, which when executed by the processor cause the processor to generate an encryption key pair and initialize a secure communication channel with a controller based on the encryption key pair.

Example 20. The circuit breaker of any one of examples 15 to 19, wherein once paired, the wireless radio ceases to broadcast the pairing beacon.

Example 21. The circuit breaker of any one of examples 15 to 18, the memory further comprising commissioning instructions, which when executed by the processor cause the processor to pair with a controller for future communication using the secure communication channel.

Example 22. The circuit breaker of any one of examples 15 to 19, wherein the wireless radio is a Bluetooth radio, a WiFi radio, a ZigBee radio, or a near field communication radio.

Example 23. The circuit breaker of any one of examples 15 to 19, the random number a first random number, the memory further comprising commissioning instructions, which when executed by the processor cause the processor to: generate the first random number; generate a second random number, wherein the unique identifier is a seed for the random number generation; and calculate the delay based on a sum of the first and second random numbers.

Example 24. A circuit breaker controller, comprising: a wireless radio; a processor coupled to the wireless radio; and a memory coupled to the processor, the memory comprising commissioning instructions, which when executed by the processor, cause the wireless radio to: send an information element comprising an indication of one or more circuit breakers with which the controller can pair; receive an indication to pair with a first one of the one or more circuit breakers; generate an encryption key pair and initialize a secure communication channel with the first one of the one or more circuit breakers based on the encryption key pair; pair the first one of the one or more circuit breakers with the controller for future communication using the secure communication channel; and send an indication on completion of the pairing with the first one of the one or more circuit breakers.

Example 25. The circuit breaker controller of example 24, the first one of the one or more circuit breakers comprising a light emitting diode (LED), the commissioning instructions further cause the wireless radio to send a command to cause the LED to illuminate to indicate a completion of pairing between the first one of the one or more circuit breakers and the controller.

Example 26. The circuit breaker controller of example 24, the commissioning instructions further cause the wireless radio to receive a pairing beacon broadcast from the first one of the one or more circuit breakers, the pairing beacon to be broadcast after a delay determined based on a random number and a unique identifier of the first one of the one or more circuit breaker.

Example 27. The circuit breaker controller of example 26, the commissioning instructions further cause the wireless radio to receive characteristic information of the first one of the one or more circuit breakers, the characteristic information comprising an indication of at least one of a model number a serial number, or a firmware version.

Example 28. The circuit breaker controller of example 26, the pairing beacon comprising an indication of at least one of an address, a device access code, or an inquiry access code of the first one of the one or more circuit breaker.

Example 29. The circuit breaker controller of any one of examples 24 to 28, the encryption key pair a first encryption key pair, the commissioning instructions further cause the wireless radio to receive a portion of a second encryption key pair, wherein initializing the secure communication channel with the first one of the one or more circuit breakers is based on the first encryption key pair and the portion of the second encryption key pair.

Example 30. The circuit breaker controller of example 29, wherein the first encryption key pair is generated based in part on the pretty good privacy (PGP) encryption scheme or the elliptic-curve diffie-hellman (ECDH) encryption scheme.

Example 31. The circuit breaker controller of example 29, wherein the portion of the second encryption key pair is a public key of the second encryption key pair.

Example 32. At least one non-transitory machine-readable storage medium comprising instructions, which when executed by a processor element of a mobile device, cause the mobile device to: capture an indication of a communicating circuit breaker; generate pairing information for the communicating circuit breaker based on the captured indication; and send the pairing information to a circuit breaker controller, the circuit breaker controller to pair with the communicating circuit breaker in response to the pairing information.

Example 33. The at least one machine-readable storage medium of example 32, the medium comprising instructions that further cause the processor to send a command to the circuit breaker controller to cause the circuit breaker controller to pair with the communicating breaker using, in part, the pairing information.

Example 34. The at least one machine-readable storage medium of example 33, the medium comprising instructions that further cause the processor to: send a command to the communicating breaker to cause the communicating breaker to illuminate a light emitting diode (LED); take a picture of a panel comprising the communicating breaker; and determine a column and row of installation of the communicating breaker from the picture based on the illuminated light emitting diode.

Example 35. The at least one machine-readable storage medium of any one of examples 33 or 34, the medium comprising instructions that further cause the processor to: receive a pairing beacon from each of one or more additional communicating breakers; and send a quiet command to each of the one or more additional communicating breaker to cause the one or more additional communicating breakers to cease broadcasting the paring beacons Example 36. The at least one machine-readable storage medium of any one of examples 35, the medium comprising instructions that further cause the processor to: generate a whitelist of communicating breaker comprising the communication breaker and the one or more additional communicating breakers; and send an indication of the whitelist to the circuit breaker controller.

Example 37. A circuit breaker and panel system, comprising: a circuit breaker controller; and a communicating circuit breaker, comprising: a processor coupled; and a memory coupled to the processor, the memory comprising commissioning instructions, which when executed by the processor, cause processor to: retrieve a unique identifier of the circuit breaker; calculate a delay time based on the unique identifier; broadcast, on a periodic basis, a pairing beacon after the delay time has lapsed; receive a quiet command from the circuit breaker controller; cease broadcasting the pairing beacon in response to the received quiet command; receive a channel ID assignment from the circuit breaker controller; receive an encryption key pair from the circuit breaker controller; and initialize secure communication with the circuit breaker controller using the encryption key pair across the assigned channel ID.

Example 38. A circuit breaker and panel system, comprising: a communicating circuit breaker; and a circuit breaker controller, comprising: a processor coupled; and a memory coupled to the processor, the memory comprising commissioning instructions, which when executed by the processor, cause processor to: receive pairing information for the communicating breaker from a mobile device; and pair with the communicating breaker to communicate with the communicating breaker using, in part, the received pairing information, the pairing comprising at least receiving an encryption key pair from the communicating breaker and initializing secure communication with the communicating breaker using the encryption key pair across the assigned channel ID.

Example 39. At least one non-transitory machine-readable storage medium comprising instructions, which when executed by a processor element of a mobile device, cause the mobile device to: capture an indication of a communicating circuit breaker; generate pairing information for the communicating circuit breaker based on the captured indication; and send the pairing information to a circuit breaker controller, the circuit breaker controller to pair with the communicating circuit breaker in response to the pairing information.

Example 40. A method for commissioning a communicating circuit breaker, comprising: receiving an indication of a one of a plurality of communicating breakers with which to pair from a mobile device; receiving command from the mobile device to pair with the one of the plurality of communicating breakers; sending a channel ID assignment to the one of the plurality of communicating breakers; receiving an encryption key pair from the one of the plurality of communicating breakers; and initializing secure communication with the one of the plurality of communicating breakers using the encryption key pair across the assigned channel ID.

Example 41. A method for decommissioning a communicating circuit breaker, comprising: receiving, at a circuit breaker controller paired with a plurality of communicating breakers, an indication of a one of the plurality of communicating breakers with which to decommission; sending, a command to the one of the plurality of communicating breakers to un-pair with the circuit breaker controller.

We claim:

1. A method for commissioning a communicating circuit breaker using a mobile device, the method comprising the steps of:
- receiving an information element from the communicating circuit breaker;
- using an input from a graphic user interface (GUI) of a mobile device to select the communicating circuit breaker wherein the input comprises a serial number of the communicating circuit breaker;
- sending a quiet command to the communicating circuit breaker to cause the communicating circuit breaker to cease broadcasting the information element;
- capturing a location of the communicating circuit breaker in a panel;
- capturing a device access code (DAC), an inquiry access code (IAC), or both and characteristics of the communicating circuit breaker;
- generating pairing information comprising the information element and the captured location;
- sending the pairing information to a circuit breaker controller; and
- sending a commissioning command to the circuit breaker controller to cause the circuit breaker controller to be commissioned with the communicating circuit breaker using, in part, the pairing information.

2. The method of claim 1, further comprising the step of sending the commissioning command to the circuit breaker controller to cause the circuit breaker controller to be commissioned with the communicating circuit breaker using, in part, the pairing information.

3. The method of claim 2, further comprising the step of receiving a response to the commissioning command from to the circuit breaker controller indicating that the communicating circuit breaker was successfully commissioned.

4. The method of claim 1, further comprising the step of sending the commissioning command to the communicating circuit breaker to cause the communicating circuit breaker to change a state of a light emitting diode (LED), the change of state being one of changing a color, changing a illumination pattern, energizing, or deenergizing the LED.

5. The method of claim 1, wherein receiving the information element comprises receiving an indication of a network address for the communicating circuit breaker.

6. The method of claim 1, wherein receiving the information element comprises receiving the information element wirelessly via a wireless communication protocol, wherein the wireless communication protocol comprises a near field communication (NFC) protocol, a Bluetooth® Low Energy (BLE) protocol, or a WiFi protocol.

7. The method of claim 1, wherein receiving the information element comprises receiving a pairing beacon from the communicating circuit breaker.

8. The method of claim 1, wherein receiving the information element comprises receiving the information element from the communicating circuit breaker via the circuit breaker controller, wherein the information element comprises a list of one or more communicating circuit breakers including the communicating circuit breaker.

9. The method of claim 1, wherein capturing the location comprises capturing an image via a camera of the mobile device and determining the location of the communicating circuit breaker in the panel based on the image.

10. The method of claim 9, wherein capturing the image comprises capturing the characteristics wherein the characteristics comprise an arc-fault circuit interrupter (AFCI), a ground-fault circuit interrupter (GFCI), a breaking capacity, a voltage rating, a model number, a firmware version, a manufacturer, a serial number, or a combination thereof, for the communicating circuit breaker.

11. The method of claim 10, further comprising storing, in a database, breaker information for the communicating circuit breaker comprising an address for the communicating circuit breaker, the characteristics, wherein the database resides in the mobile device, the circuit breaker controller, a cloud, the Internet, or a combination thereof.

12. The method of claim 1, wherein sending the pairing information further comprises sending the DAC, the IAC, or both.

13. The method of claim 1, wherein sending the commissioning command to the circuit breaker controller comprises:
- establishing a pairing relationship between the communicating circuit breaker and the circuit breaker controller and
- sending details of the pairing relationship to the circuit breaker controller such that the circuit breaker controller inherits the pairing relationship.

14. The method of claim 1, further comprising a step of commissioning each additional circuit breaker of a plurality of circuit breakers, wherein the step of commissioning comprises:
- receiving a respective information element from each additional circuit breaker;
- sending a quiet command to each additional circuit breaker to cause each additional circuit breaker to cease broadcasting the respective information element;
- capturing a respective location of each additional circuit breaker in the panel;
- generating respective pairing information comprising the respective information element and the captured location for each additional circuit breaker;
- sending the respective pairing information to the circuit breaker controller; and
- sending a respective commissioning command to the circuit breaker controller to cause the circuit breaker controller to be commissioned with each additional communicating circuit breaker using, in part, the pairing information for each additional circuit breaker.

15. The method of claim 14, wherein sending the respective commissioning command occurs after one or more of:

the information elements cease to be received by the circuit breaker controller; or a period of time has elapsed.

16. The method of claim 14, wherein the circuit breaker controller periodically opens a communication channel to receive additional pairing beacons; or the circuit breaker controller maintains an open communication channel to receive the additional pairing beacons.

17. A method for commissioning a plurality of communicating circuit breakers using a circuit breaker controller, the method comprising the steps of:

for each respective communicating circuit breaker of the plurality of the communicating circuit breakers:

receiving a pairing beacon from a respective communicating circuit breaker, the pairing beacon including a device access code (DAC), an inquiry access code (IAC), or both and characteristics of the respective communicating circuit breaker;

sending a quiet command to the respective communicating circuit breaker to cause the respective communicating circuit breaker to cease broadcasting the pairing beacon; and wherein the method is performed for each of the respective communicating circuit breakers at varying points of time, wherein the method is performed for each of the plurality of the communicating circuit breakers after a delay, the delay based at least in part on a unique identifier of the respective communicating circuit breaker; generating a list of the plurality of the communicating circuit breakers;

providing access to the list via a user interface or a graphical user interface (GUI) by inputting a serial number of the communicating circuit breaker; and sending an indication of the list to the circuit breaker controller.

18. The method of claim 17, further comprising the step of causing information to be stored in a database, the information comprising one or more of:

a position of the respective communicating circuit breaker in a circuit breaker panel;

a commissioning status of the respective communicating circuit breaker;

a list including the respective communicating circuit breaker; or the characteristic of the respective communicating circuit breaker.

19. The method of claim 18, wherein the characteristic of the respective communicating circuit breaker is one or more of:

a manufacturer of the respective communicating circuit breaker;

a current rating;

a voltage rating;

a type of the respective communicating circuit breaker;

a model number;

a serial number; or a firmware version.

20. The method of claim 18, wherein the step of causing the information to be stored in the database, the database located in one or more of:

a circuit breaker controller;

a mobile device;

a cloud; or the Internet.

21. The method of claim 17, wherein the circuit breaker controller is implemented in a mobile device.

* * * * *